(12) United States Patent
Iwamoto

(10) Patent No.: US 9,134,512 B2
(45) Date of Patent: Sep. 15, 2015

(54) ZOOM LENS AND IMAGE PICKUP APPARATUS HAVING THE SAME

(71) Applicant: CANON KABUSHIKI KAISHA, Tokyo (JP)

(72) Inventor: Shunji Iwamoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 13/785,207

(22) Filed: Mar. 5, 2013

(65) Prior Publication Data

US 2013/0235466 A1 Sep. 12, 2013

(30) Foreign Application Priority Data

Mar. 12, 2012 (JP) ................................ 2012-054368

(51) Int. Cl.
| | |
|---|---|
| *G02B 15/14* | (2006.01) |
| *G02B 13/00* | (2006.01) |
| *G02B 15/173* | (2006.01) |
| *G02B 15/16* | (2006.01) |
| *G02B 27/64* | (2006.01) |

(52) U.S. Cl.
CPC ............ *G02B 13/009* (2013.01); *G02B 15/173* (2013.01); *G02B 15/16* (2013.01); *G02B 27/646* (2013.01)

(58) Field of Classification Search
CPC ...... G02B 13/009; G02B 15/14; G02B 15/15; G02B 15/16; G02B 15/163; G02B 15/167; G02B 15/173; G02B 27/646

USPC .................. 359/676, 683, 680, 682, 684, 690
See application file for complete search history.

(56) References Cited

U.S. PATENT DOCUMENTS

| | | | |
|---|---|---|---|
| 5,189,557 A | 2/1993 | Endo | |
| 6,563,643 B2 * | 5/2003 | Hayakawa et al. | ........... 359/557 |
| 6,646,803 B2 * | 11/2003 | Hayakawa et al. | ........... 359/557 |
| 7,068,428 B2 * | 6/2006 | Misaka | ........... 359/557 |
| 7,206,126 B2 * | 4/2007 | Endo | ............. 359/361 |
| 7,961,402 B2 * | 6/2011 | Saori | ............. 359/683 |
| 2012/0050603 A1 * | 3/2012 | Imaoka et al. | ................ 348/347 |

FOREIGN PATENT DOCUMENTS

JP 2004-317867 A 11/2004

* cited by examiner

*Primary Examiner* — Thomas K Pham
*Assistant Examiner* — Nicholas R Pasko
(74) *Attorney, Agent, or Firm* — Canon USA Inc. IP Division

(57) ABSTRACT

A zoom lens includes, from the object side to the image side, first to sixth lens units having positive, negative, positive, negative, positive, negative refracting powers. In zooming from the wide angle end to the telephoto end, the lens units are moved such that the distance between the first and second lens units increases, the distance between the second and third lens units decreases, the distance between the third and fourth lens units increases, and the distance between the fourth and fifth lens units decreases. In focusing from an infinitely distant object to a near object, the sixth lens unit is moved toward the image side. The distance between the rear principal point of the second lens unit and the front principal point of the rear lens group at the wide angle end, and the focal length of the rear lens group at the wide angle end are appropriately set.

17 Claims, 31 Drawing Sheets

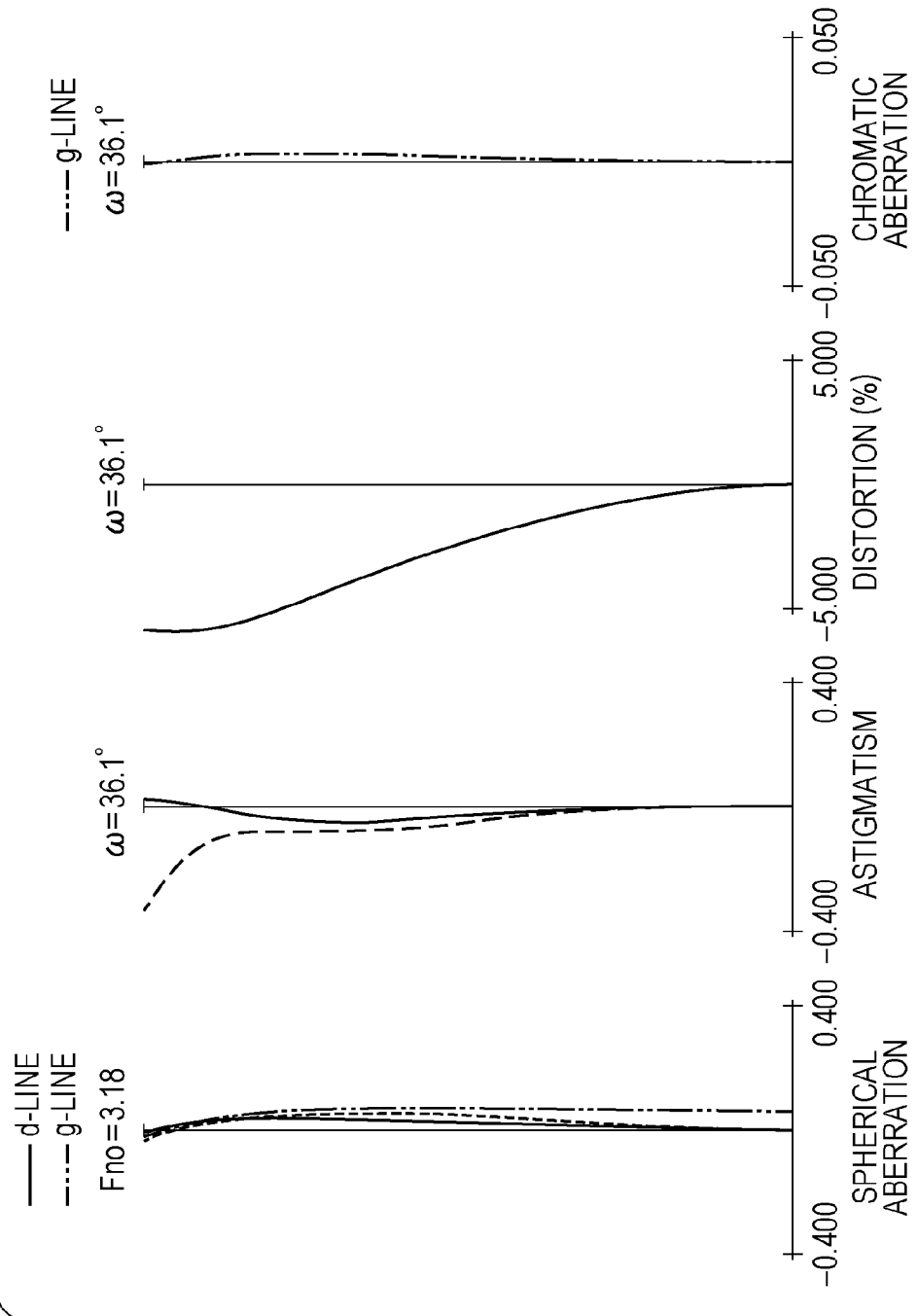

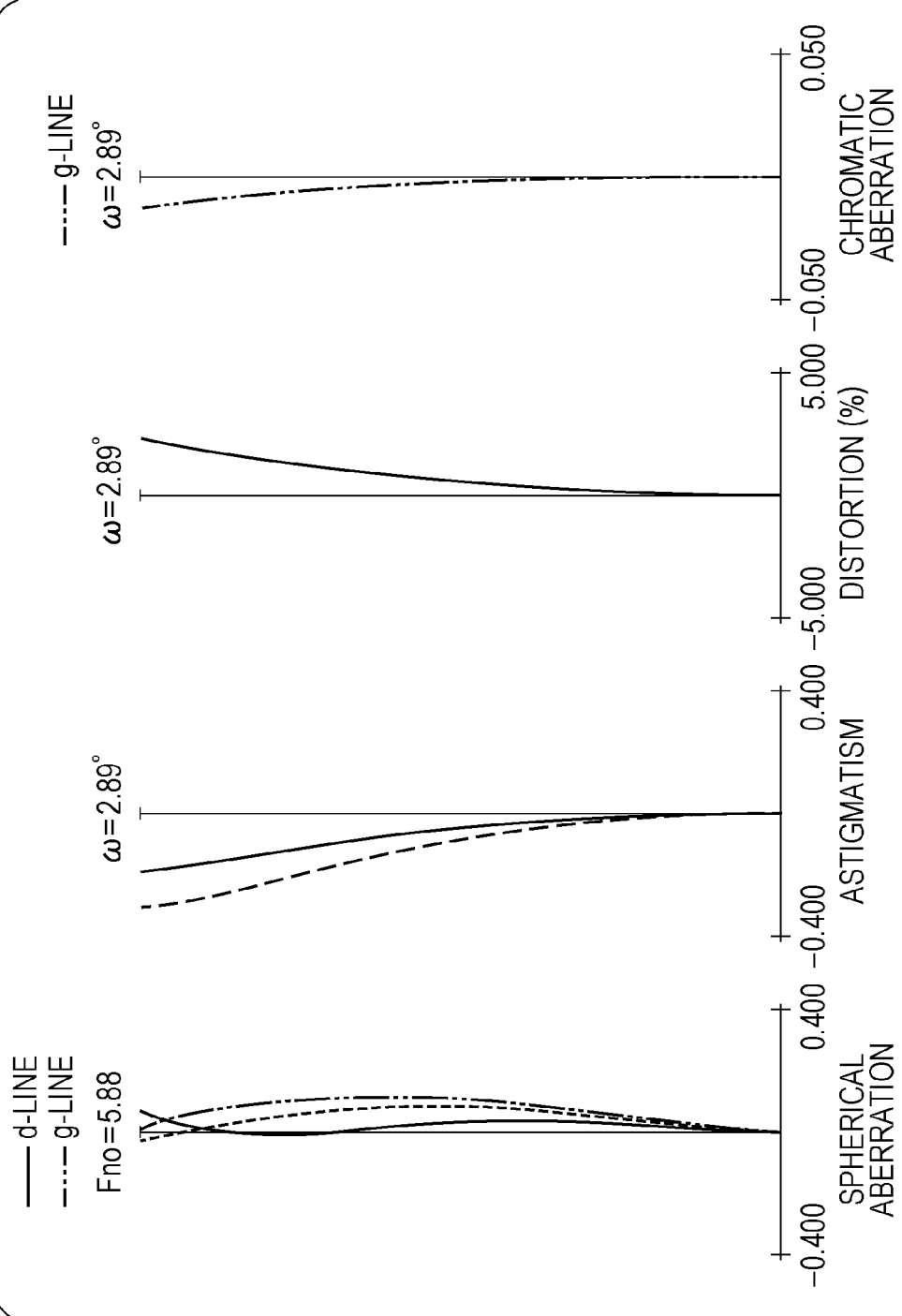

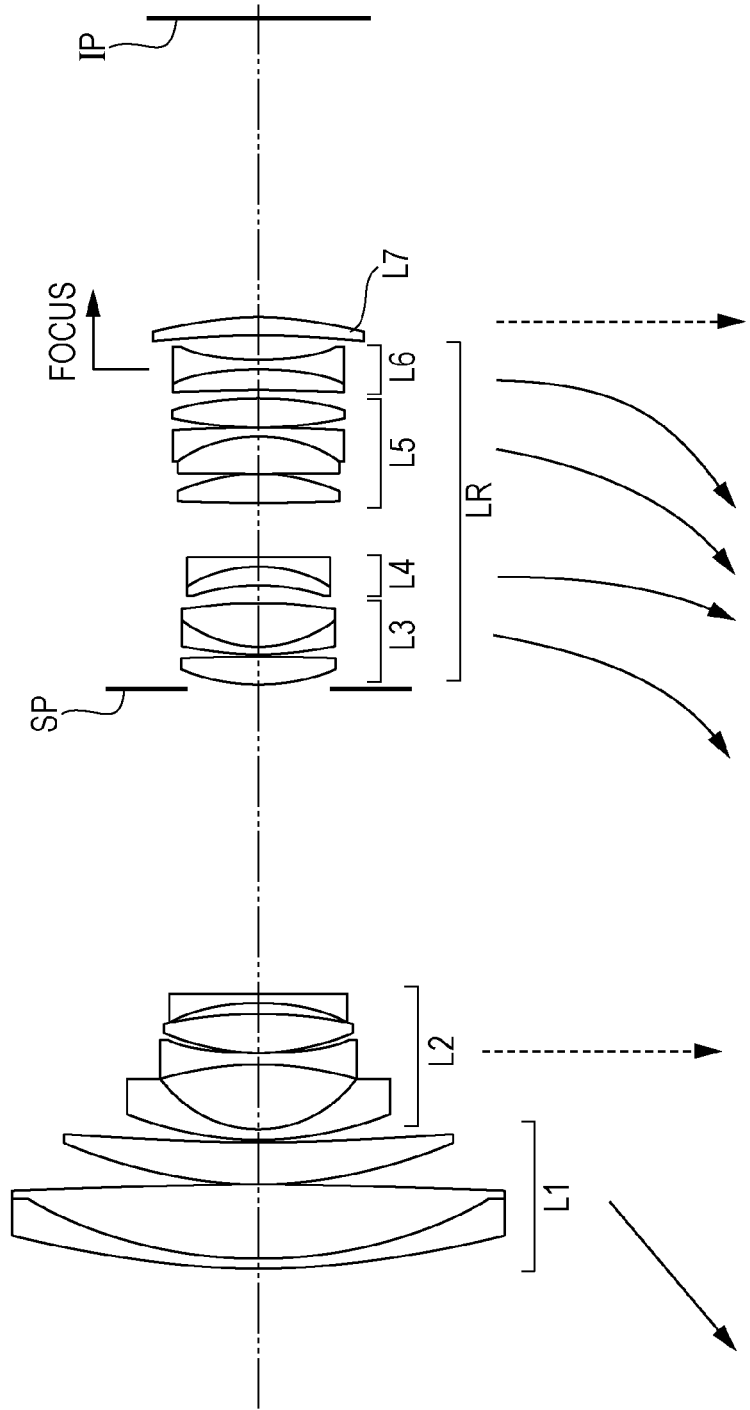

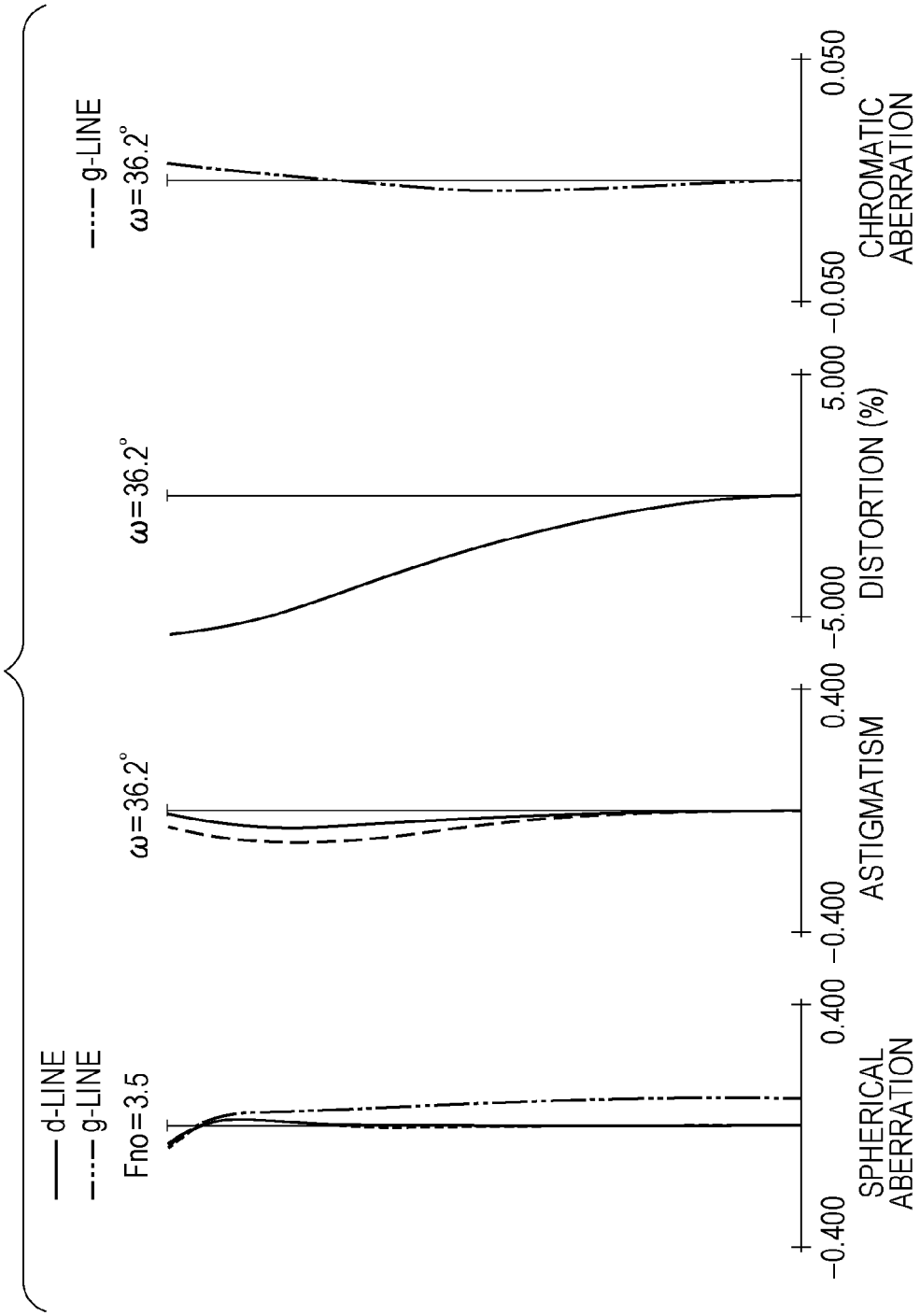

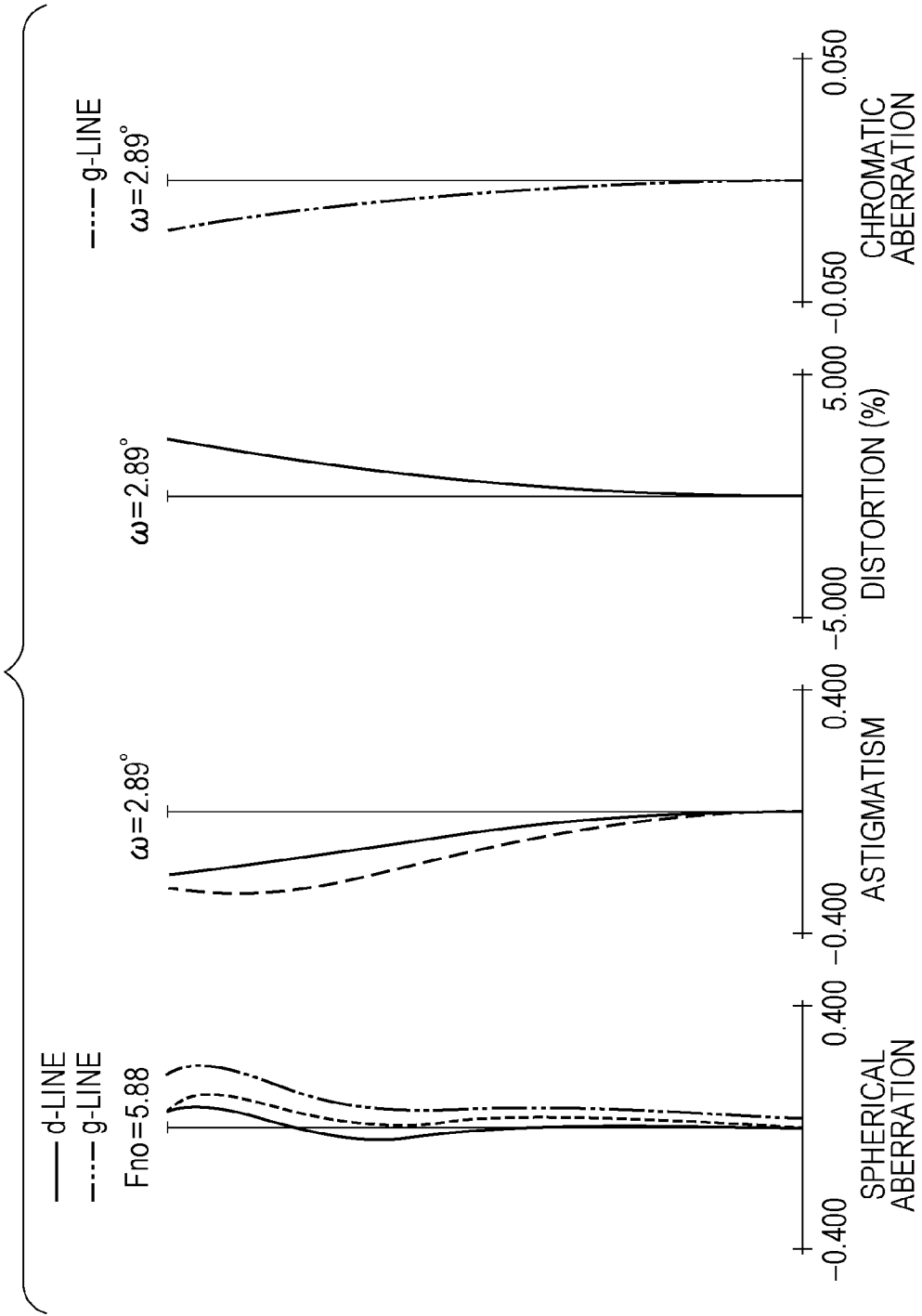

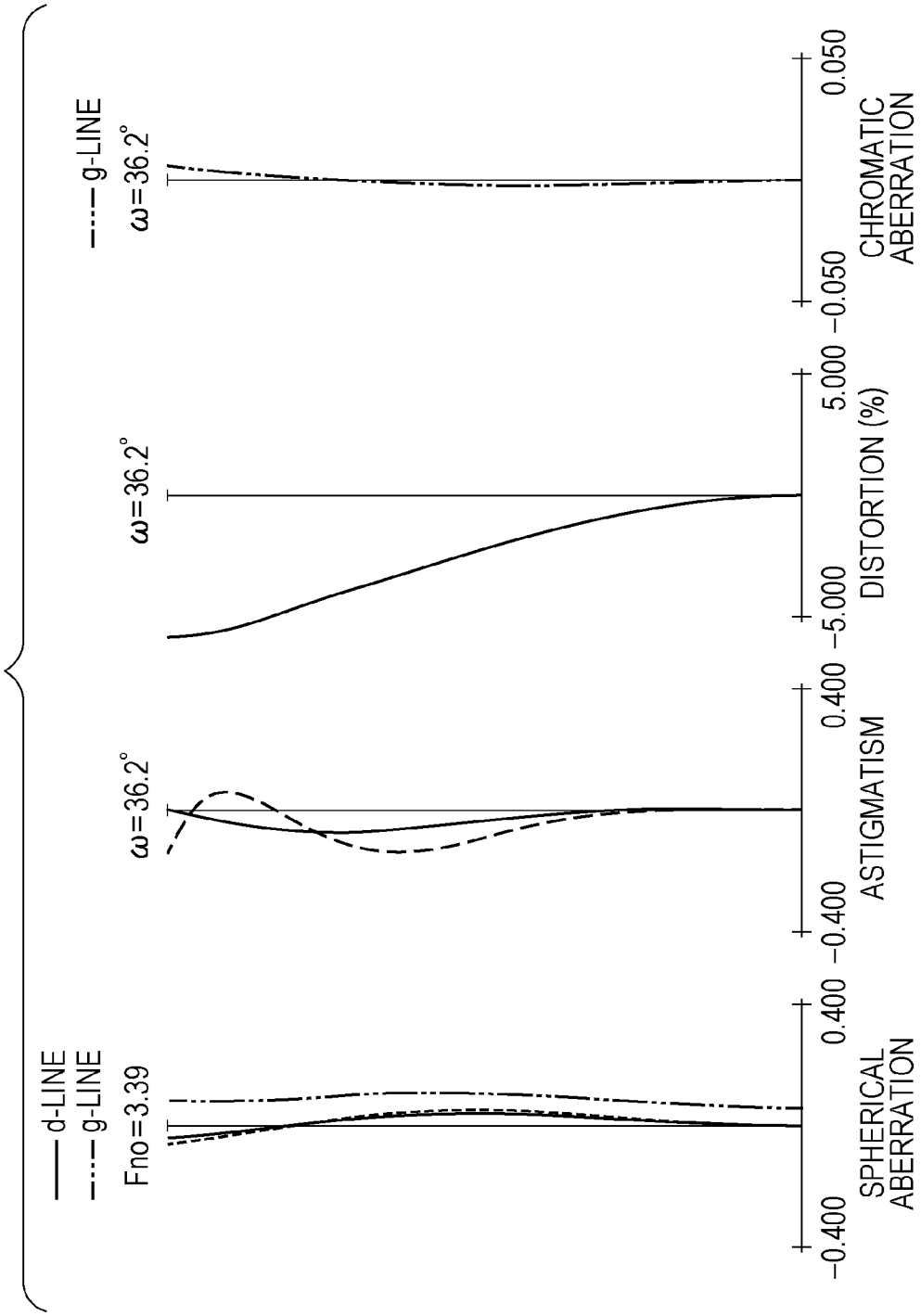

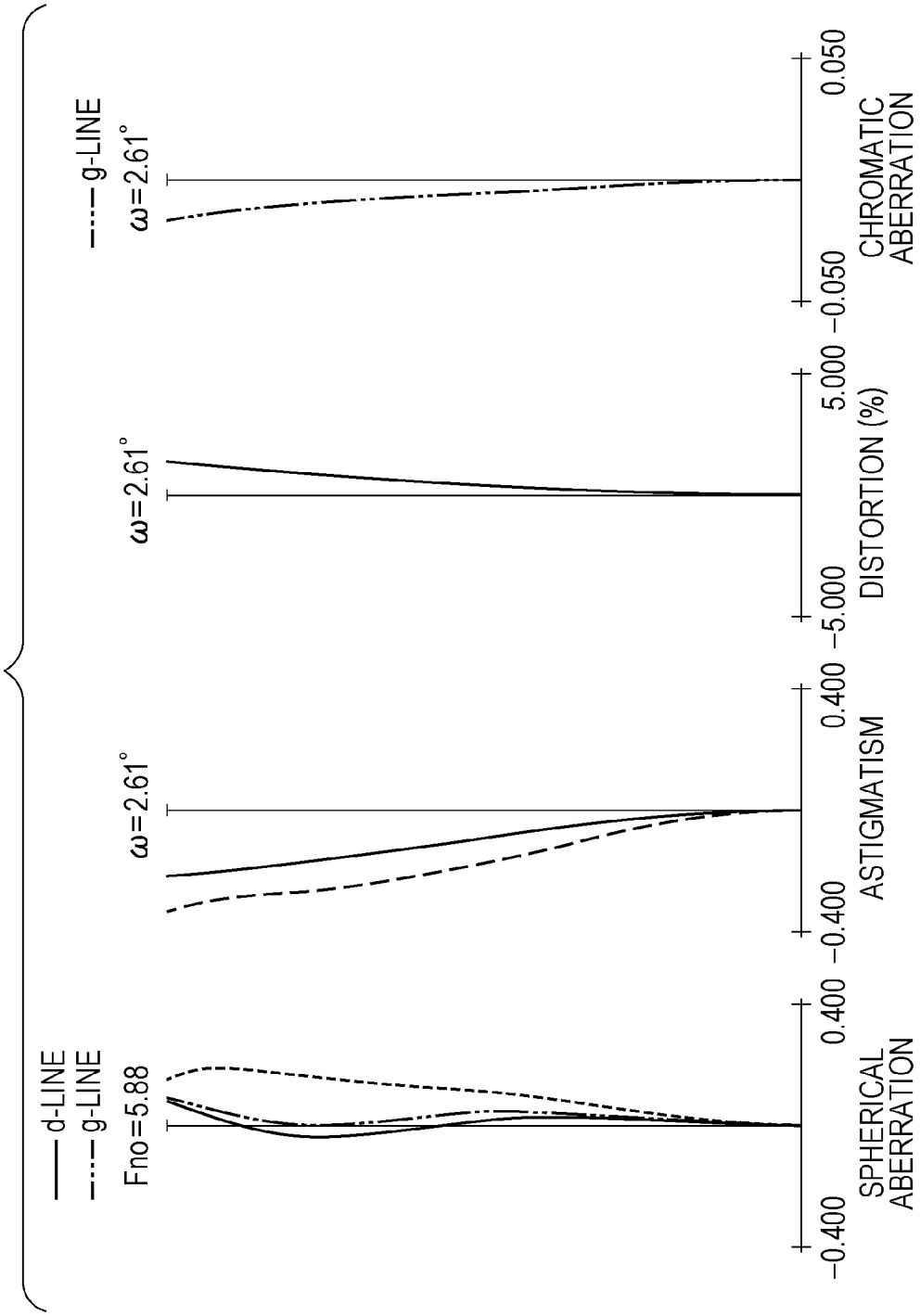

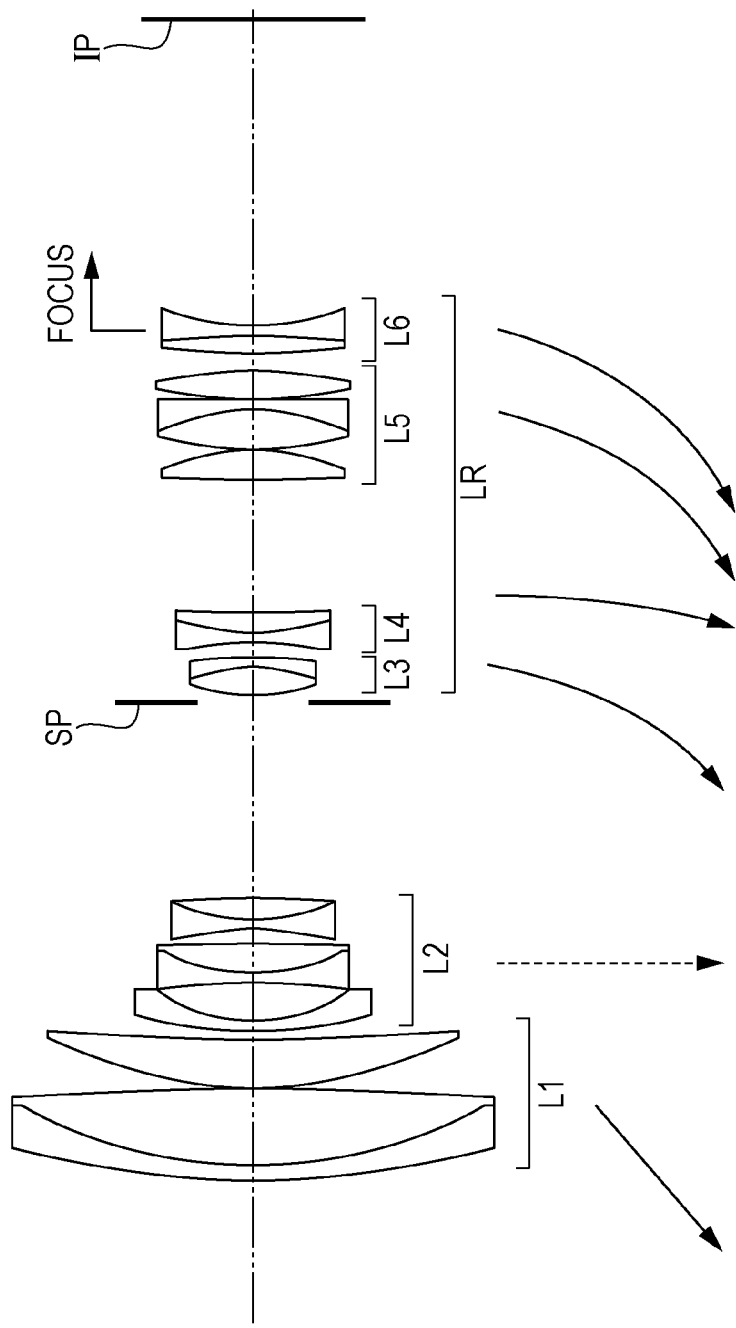

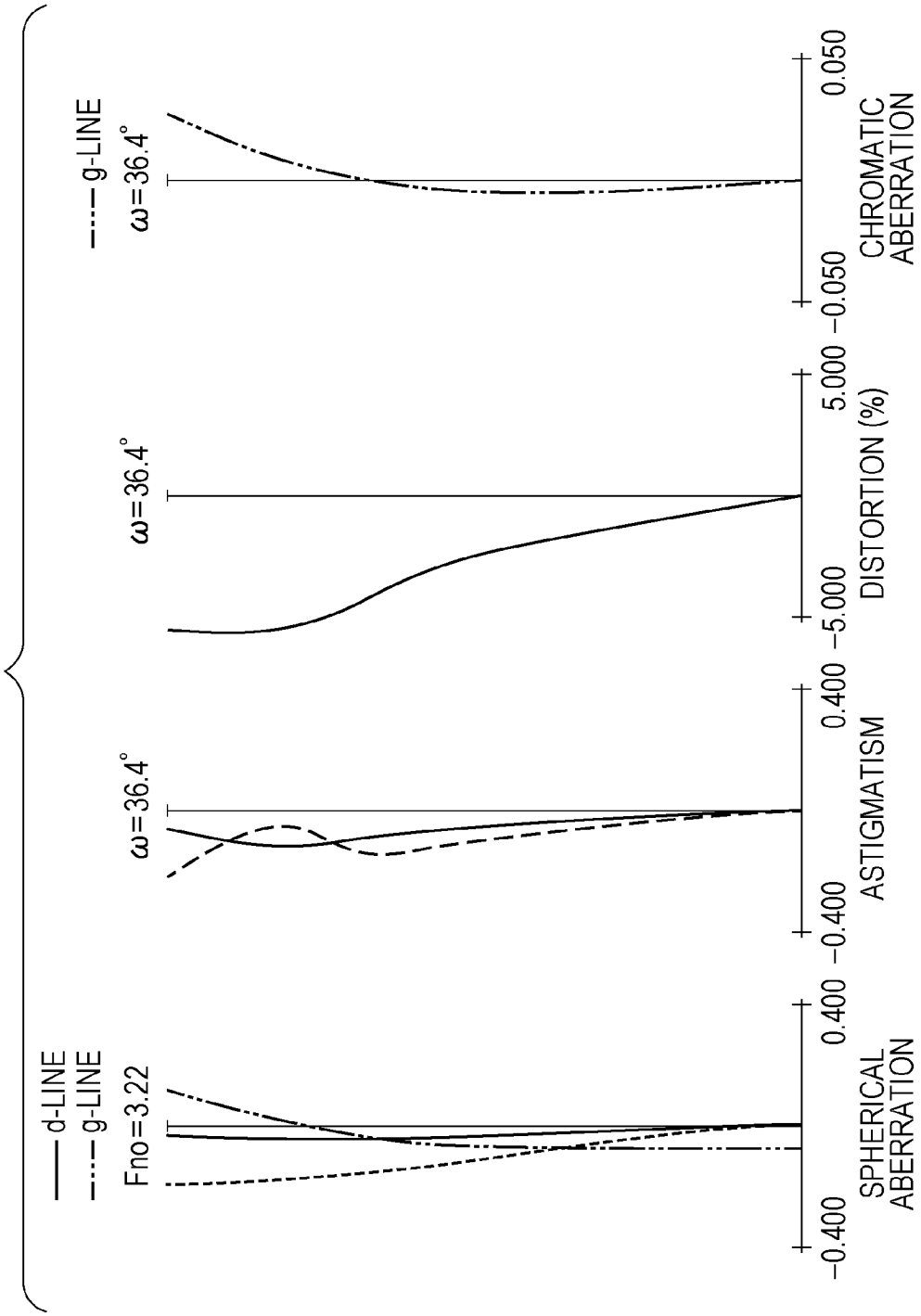

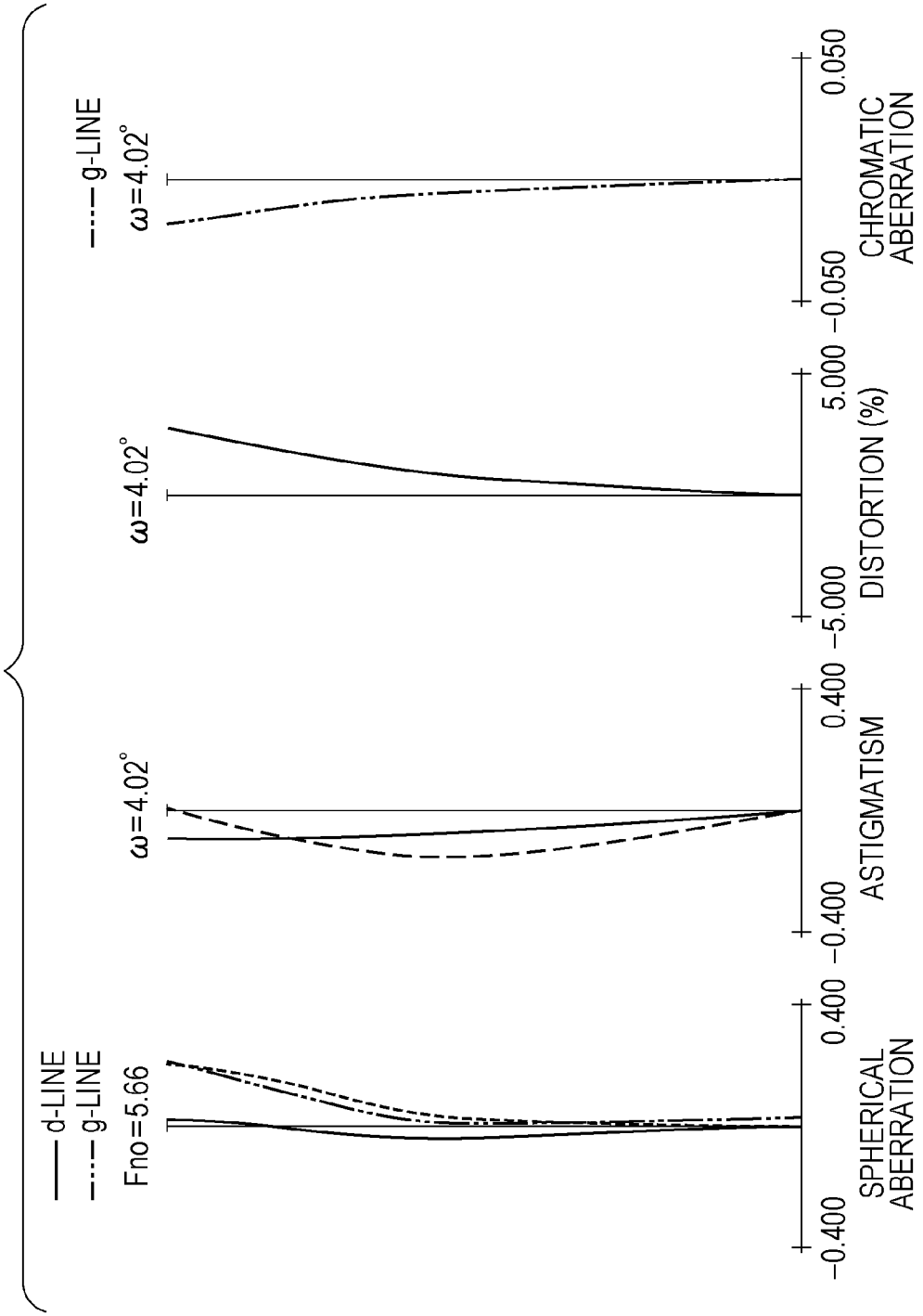

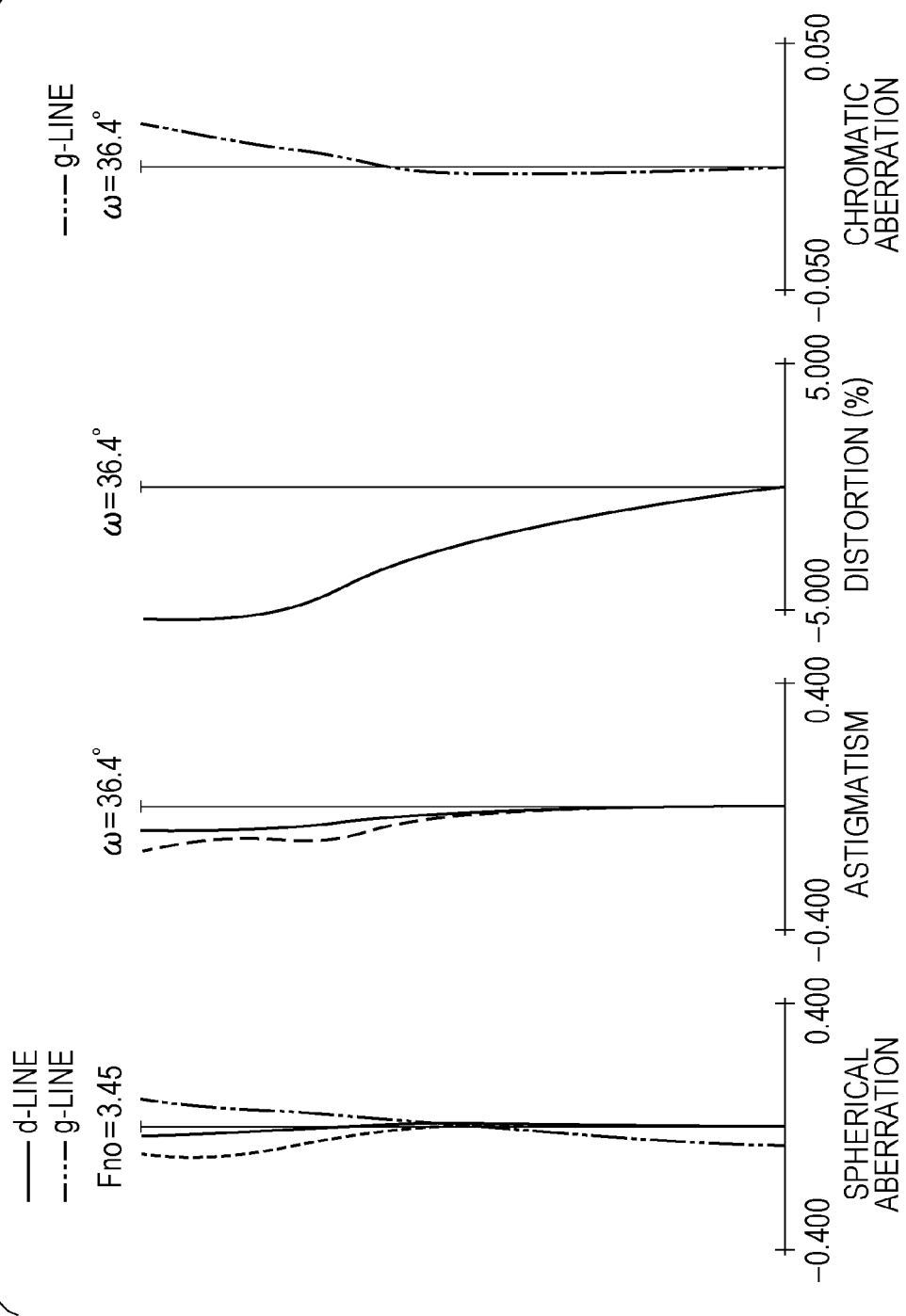

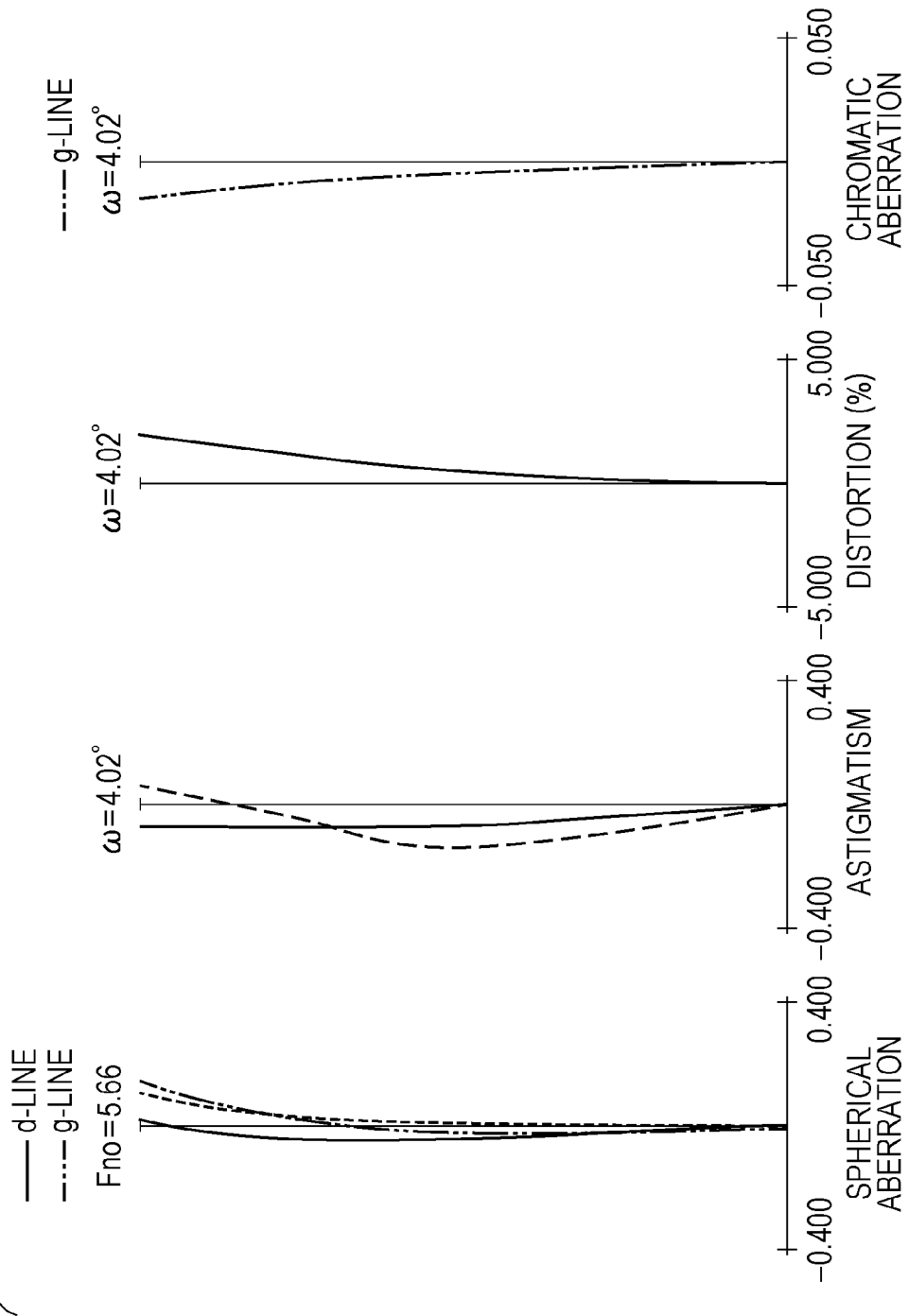

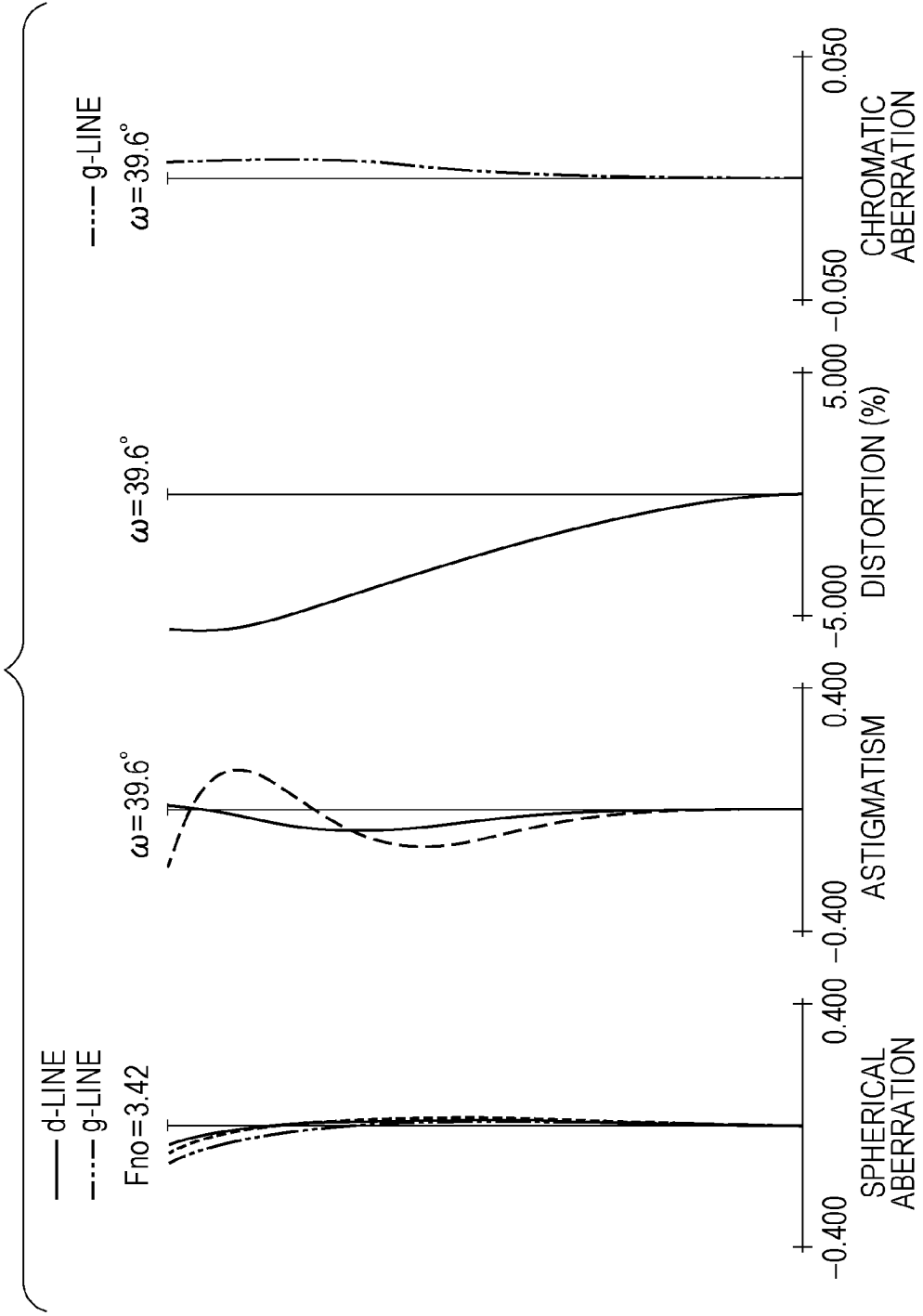

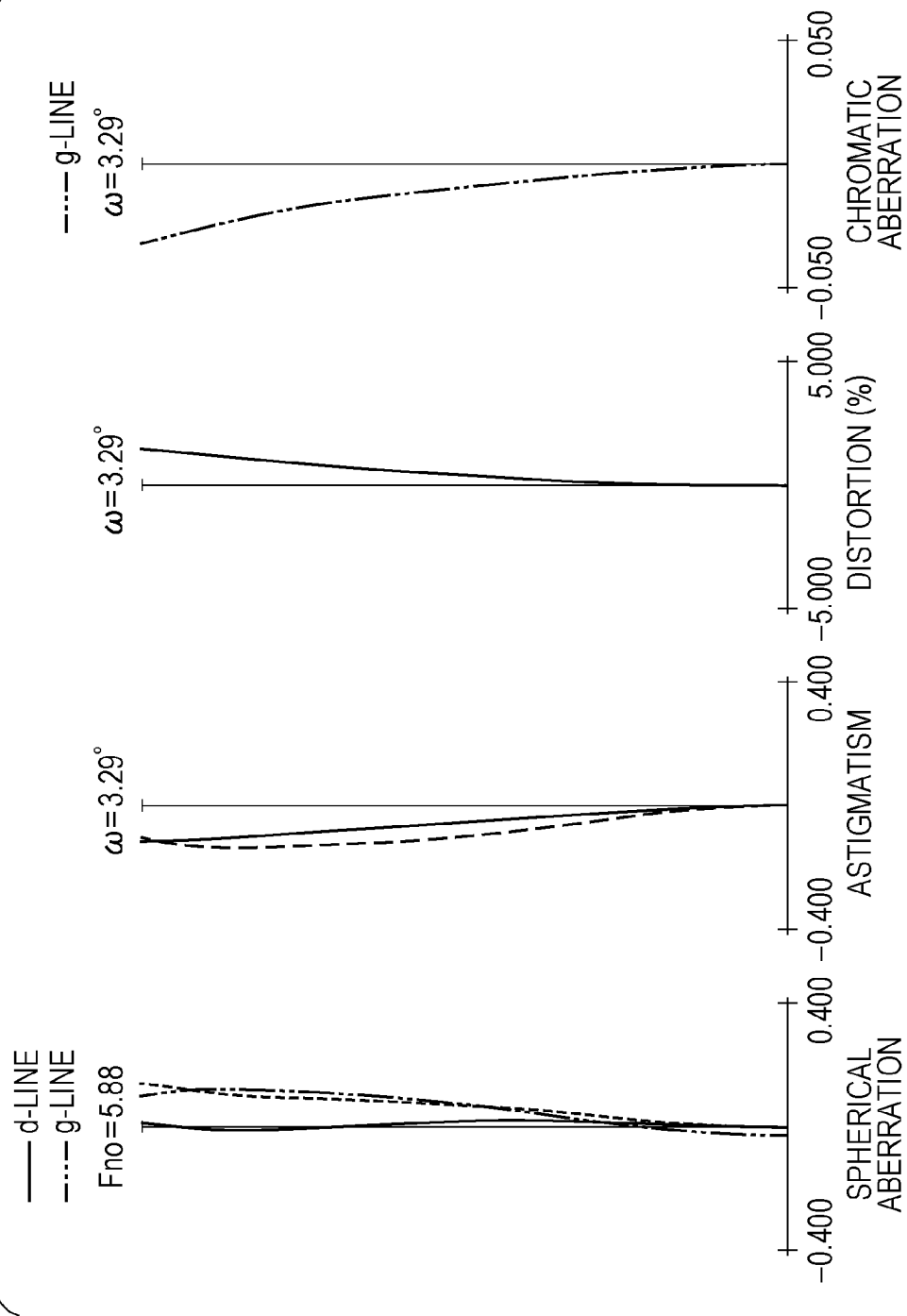

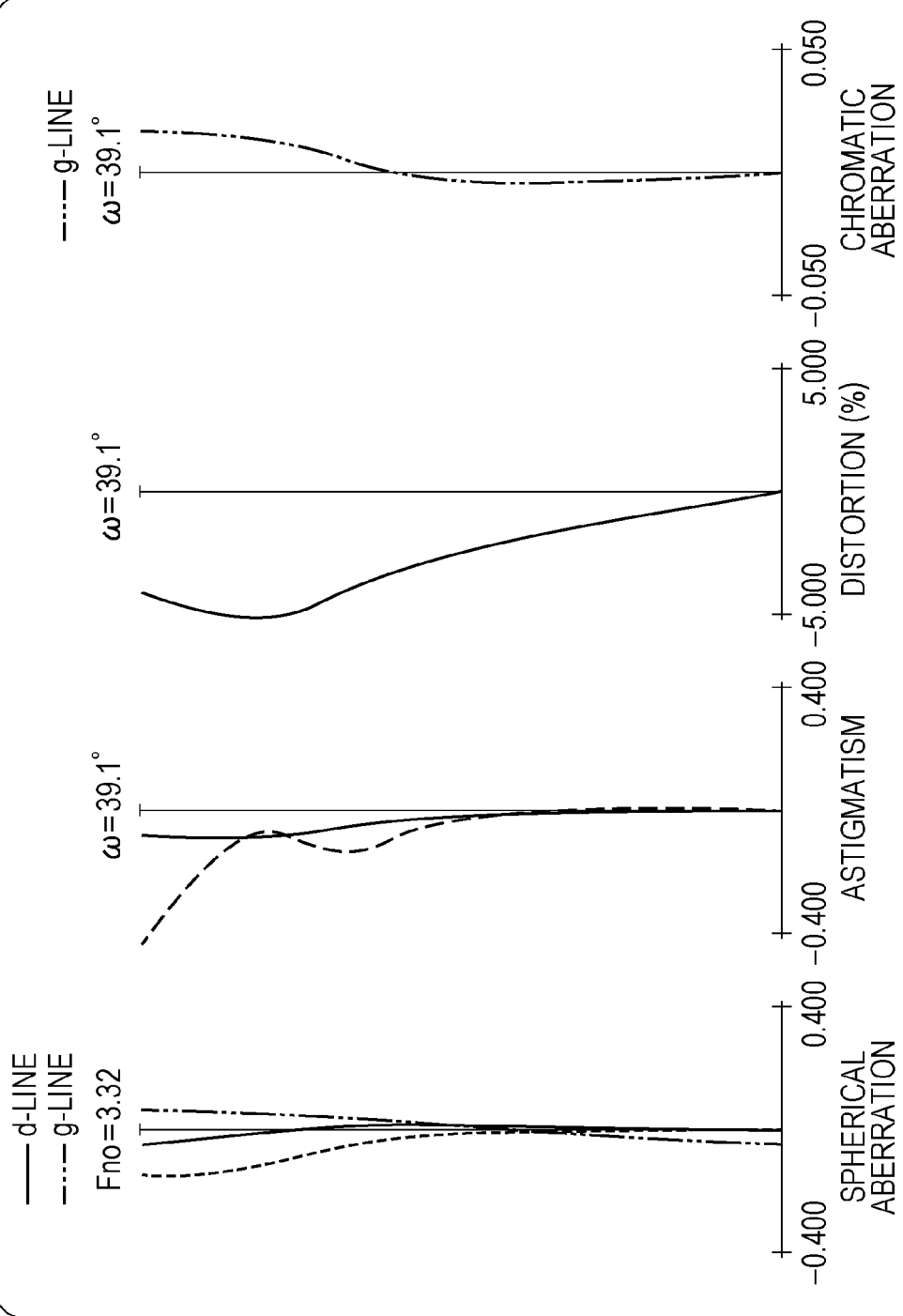

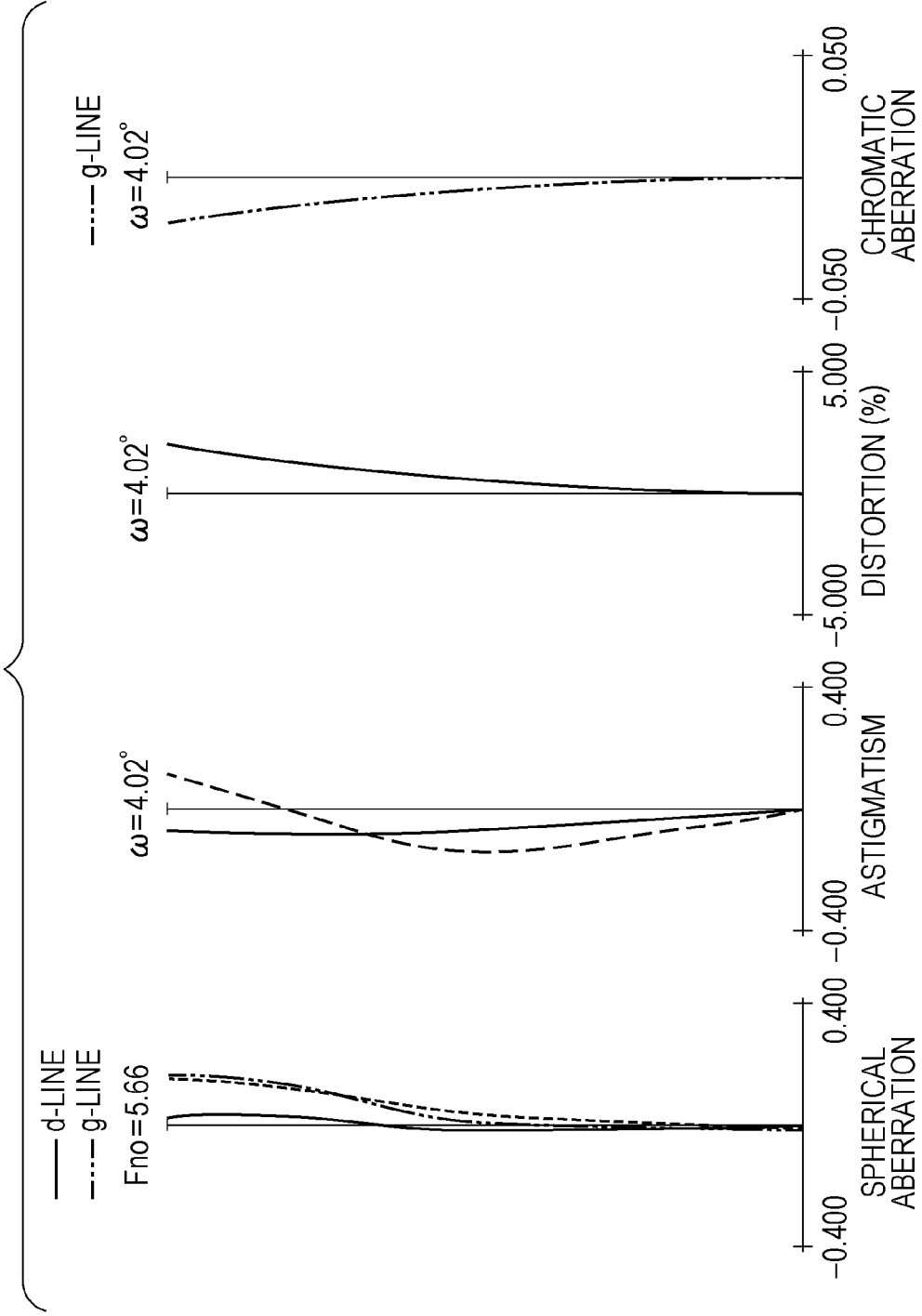

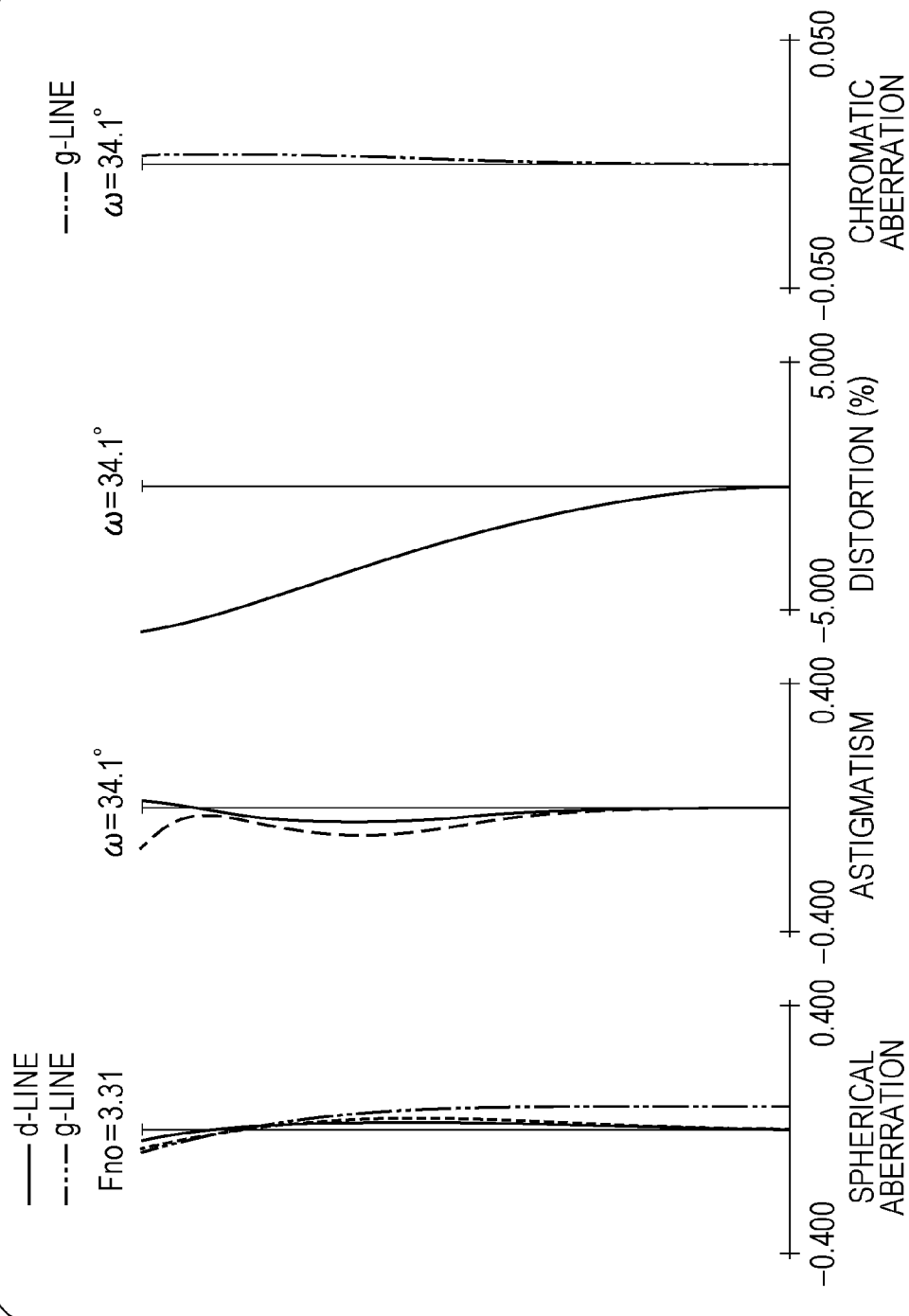

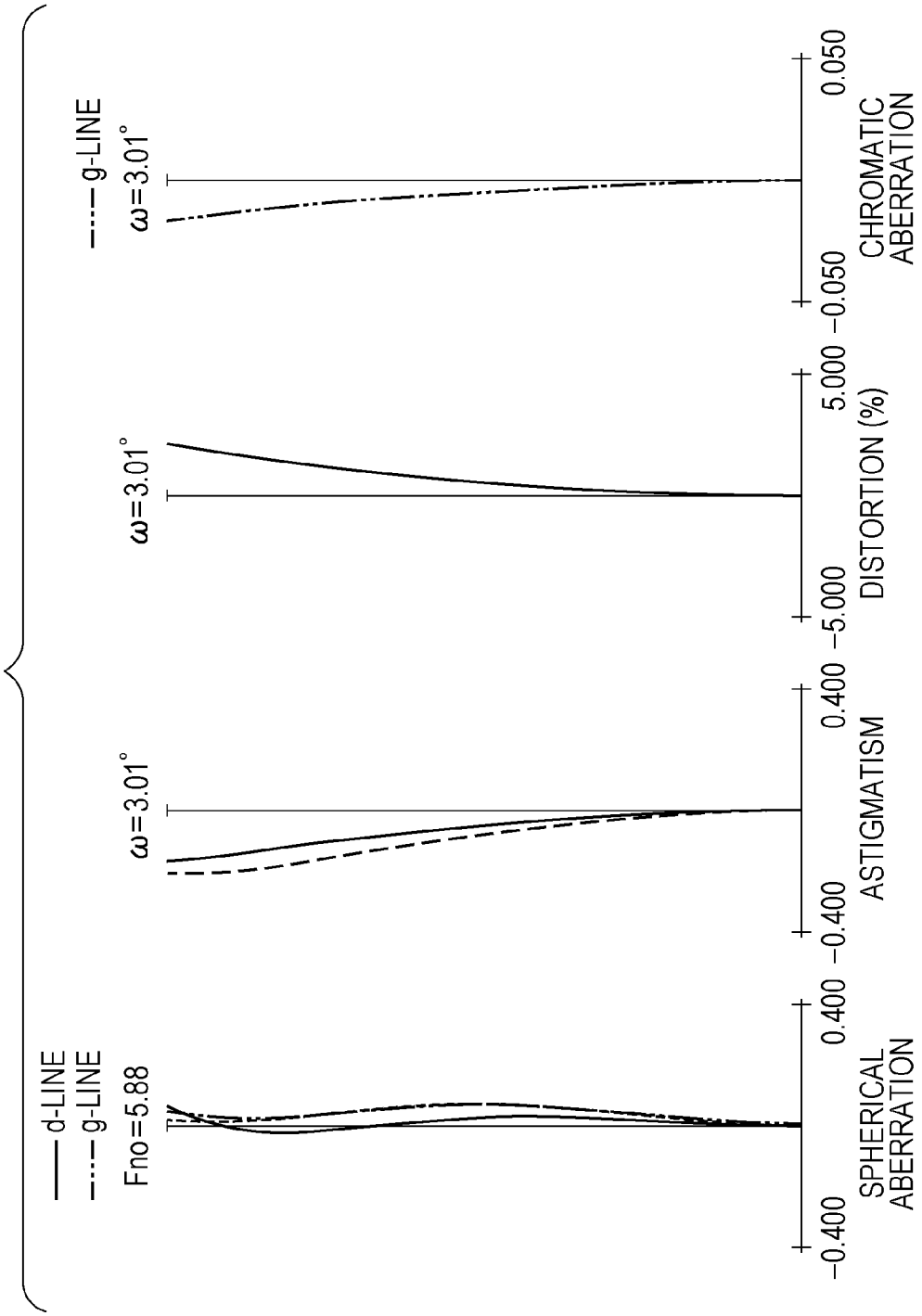

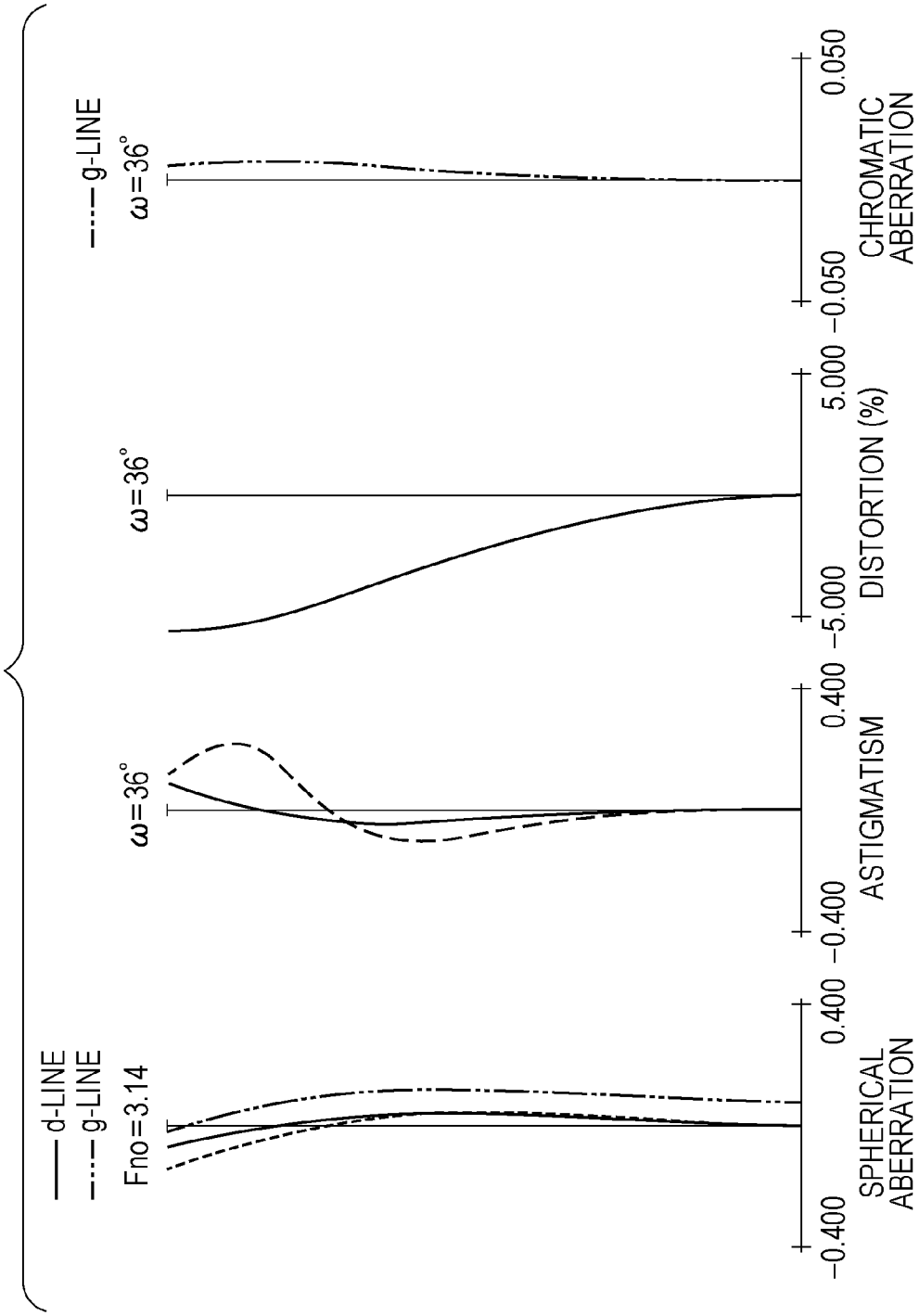

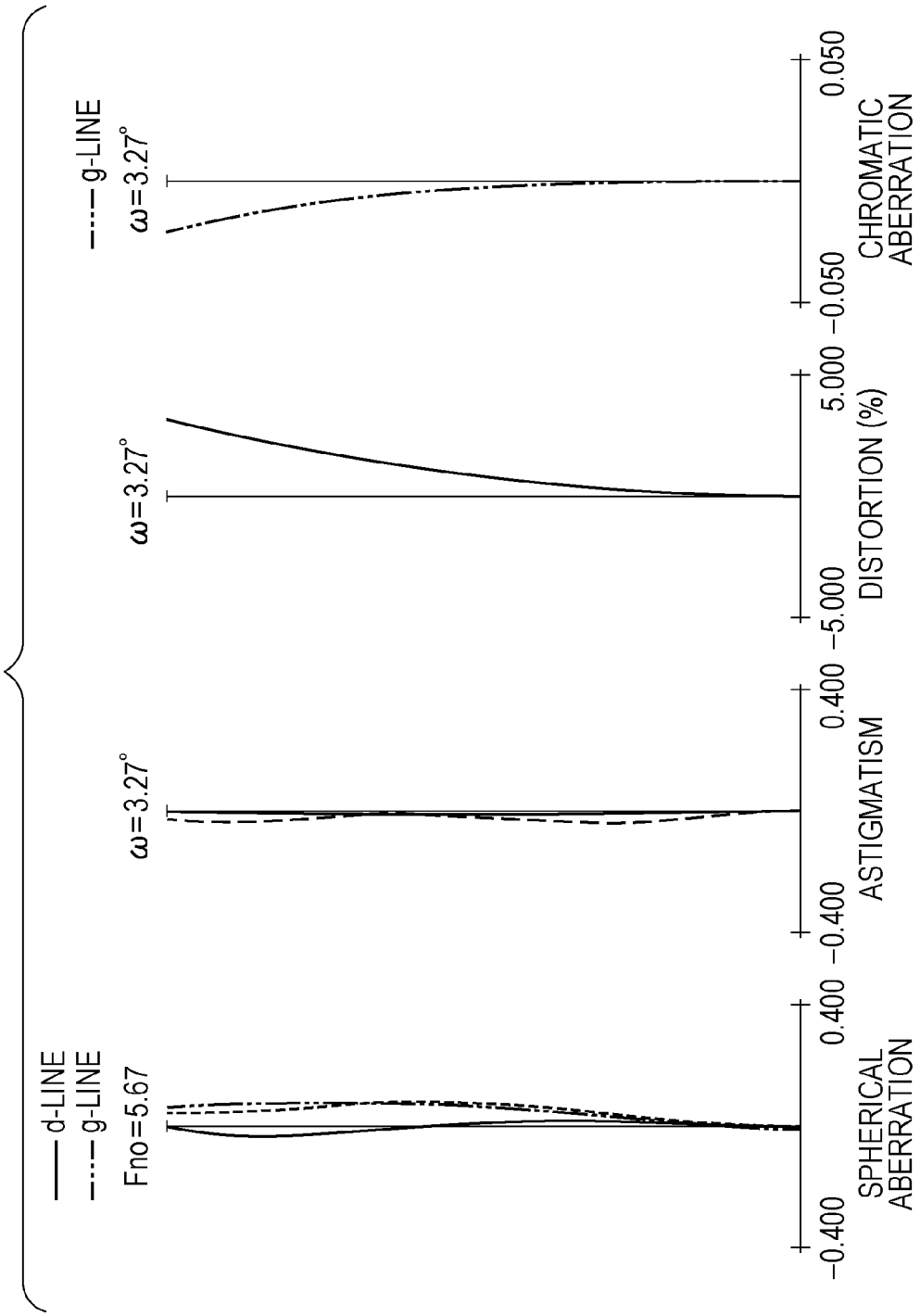

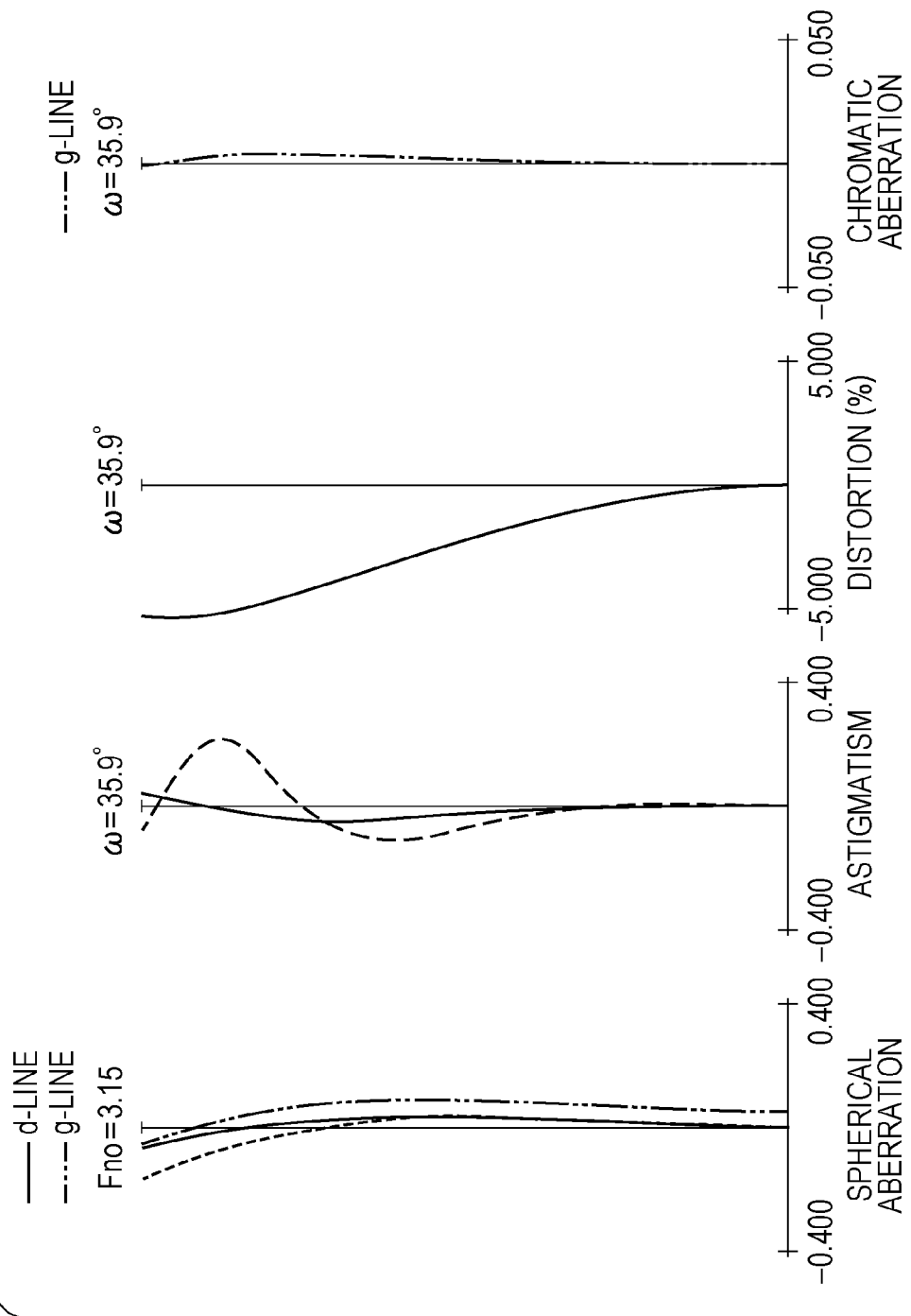

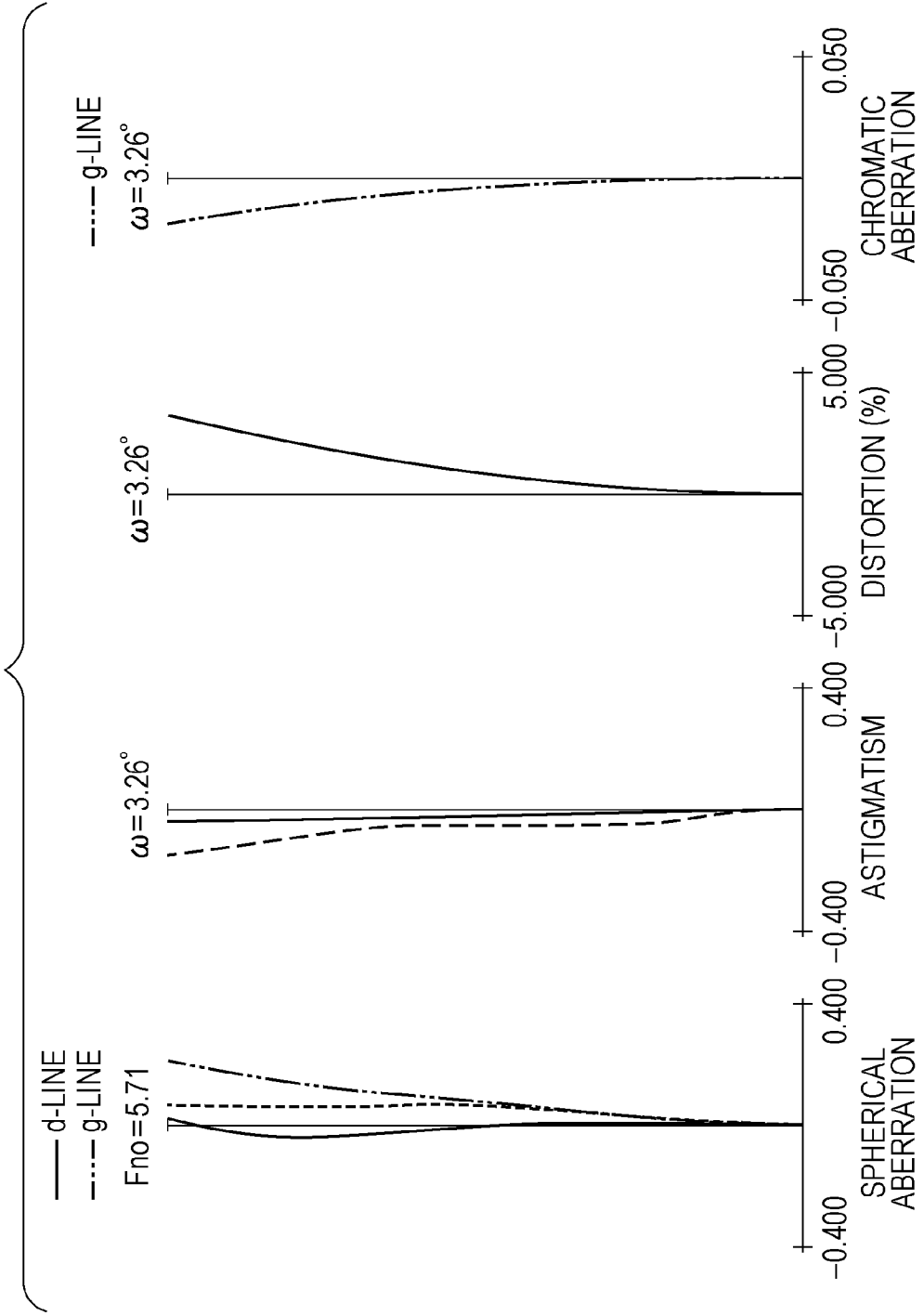

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same, which are suitably used in, for example, a video camera, a digital still camera, a monitoring camera, a film camera, and a broadcast camera.

2. Description of the Related Art

A zoom lens for an image pickup apparatus, such as a digital camera or a video camera, is required to include a wide angle area, have a high zoom ratio, and have a back focus of a predetermined length. At the same time, the entire optical system needs to be small. Moreover, the zoom lens is required to have high optical performance over the entire object length from an infinitely distant object to a near object.

It is easy to achieve a high zoom ratio with a positive-lead-type zoom lens, in which a lens unit closest to the object side has positive refracting power. It is easy to reduce the size of the entire optical system with an inner-focus zoom lens, or a rear-focus zoom lens, in which focus is performed by moving the second and subsequent lens units along the optical axis.

U.S. Pat. No. 5,189,557 discloses a zoom lens that includes first to sixth lens units having, in order from the object side to the image side, positive, negative, positive, negative, positive, and negative refracting powers. This zoom lens performs zooming by moving these lens units and performs focusing by moving the sixth lens unit.

Japanese Patent Laid-Open No. 2004-317867 discloses a rear-focusing zoom lens including seven lens units having, in order from the object side to the image side, positive, negative, positive, negative, positive, negative, and positive refracting powers. This zoom lens performs zooming by moving six lens units on the object side and performs focusing with the sixth lens unit.

In general, a small zoom lens having a predetermined zoom ratio may be realized by increasing the refracting powers (i.e., the optical power: the reciprocal of the focal length) of the lens units constituting the zoom lens while reducing the number of the lenses. However, this increases variation of aberrations associated with zooming and focusing, making it difficult to achieve high optical performance over the entire zoom range and object length.

In order to achieve a positive-lead type zoom lens having high optical performance over the entire zoom range and object length, the zoom type, the powers of the lens units, and the lens configurations of the lens units need to be appropriately set.

The present invention provides a small zoom lens having a wide angle of view, a high zoom ratio, and high optical performance over the entire zoom range, and an image pickup apparatus having such a zoom lens.

SUMMARY OF THE INVENTION

A zoom lens of the invention includes, in order from the object side to the image side: a first lens unit having positive refracting power; a second lens unit having negative refracting power; a third lens unit having positive refracting power; a fourth lens unit having negative refracting power; a fifth lens unit having positive refracting power; and a sixth lens unit having negative refracting power. In zooming from the wide angle end to the telephoto end, the lens units are moved such that the distance between the first lens unit and the second lens unit is increased, the distance between the second lens unit and the third lens unit is decreased, the distance between the third lens unit and the fourth lens unit is increased, and the distance between the fourth lens unit and the fifth lens unit is decreased. In focusing from an infinitely distant object to a near object, the sixth lens unit is moved toward the image side. The zoom lens satisfies a conditional expression $1.4 < D2Rw/fRw < 2.0$, where $D2Rw$ is the distance, at the wide angle end, between the rear principal point of the second lens unit and the front principal point of a rear lens group including the third and subsequent lens units, and $fRw$ is the focal length of the rear lens group at the wide angle end.

Further features of the present invention will become apparent from the following description of exemplary embodiments with reference to the attached drawings.

BRIEF DESCRIPTION OF THE DRAWINGS

FIGS. 2A and 2B are aberration diagrams of the zoom lens, at the wide angle end and the telephoto end, according to the first embodiment.

FIG. 3 is a lens cross-sectional view of a zoom lens, at the wide angle end, according to a second embodiment.

FIGS. 4A and 4B are aberration diagrams of the zoom lens, at the wide angle end and the telephoto end, according to the second embodiment.

FIGS. 6A and 6B are aberration diagrams of the zoom lens, at the wide angle end and the telephoto end, according to the third embodiment.

FIG. 7 is a lens cross-sectional view of a zoom lens, at the wide angle end, according to a fourth embodiment.

FIGS. 8A and 8B are aberration diagrams of the zoom lens, at the wide angle end and the telephoto end, according to the fourth embodiment.

FIGS. 10A and 10B are aberration diagrams of the zoom lens, at the wide angle end and the telephoto end, according to the fifth embodiment.

FIGS. 12A and 12B are aberration diagrams of the zoom lens, at the wide angle end and the telephoto end, according to the sixth embodiment.

FIGS. 14A and 14B are aberration diagrams of the zoom lens, at the wide angle end and the telephoto end, according to a seventh embodiment.

FIGS. 16A and 16B are aberration diagrams of the zoom lens, at the wide angle end and the telephoto end, according to the eighth embodiment.

FIGS. 18A and 18B are aberration diagrams of the zoom lens, at the wide angle end and the telephoto end, according to the ninth embodiment.

FIGS. 20A and 20B are aberration diagrams of the zoom lens, at the wide angle end and the telephoto end, according to the tenth embodiment.

DESCRIPTION OF THE EMBODIMENTS

Embodiments of a zoom lens and an image pickup apparatus having the same of the present invention will be described. A zoom lens of the present invention includes, in order from the object side to the image side, a first lens unit having positive refracting power, a second lens unit having negative refracting power, a third lens unit having positive refracting power, a fourth lens unit having negative refracting power, a fifth lens unit having positive refracting power, and a sixth lens unit having negative refracting power. The zoom lens of the present invention may further include a seventh lens unit having positive refracting power.

In zooming from the wide angle end to the telephoto end, the first lens unit and the third to sixth lens units are moved toward the object side. More specifically, the lens units are moved such that the distance between the first lens unit and the second lens unit is increased, the distance between the second lens unit and the third lens unit is decreased, and the distance between the third lens unit and the fourth lens unit is increased. Furthermore, the lens units are moved such that the distance between the fourth lens unit and the fifth lens unit is decreased, and the distance between the fifth lens unit and the sixth lens unit is changed. In focusing from an infinitely distant object to a near object, the sixth lens unit is moved toward the image side.

Figure 1:
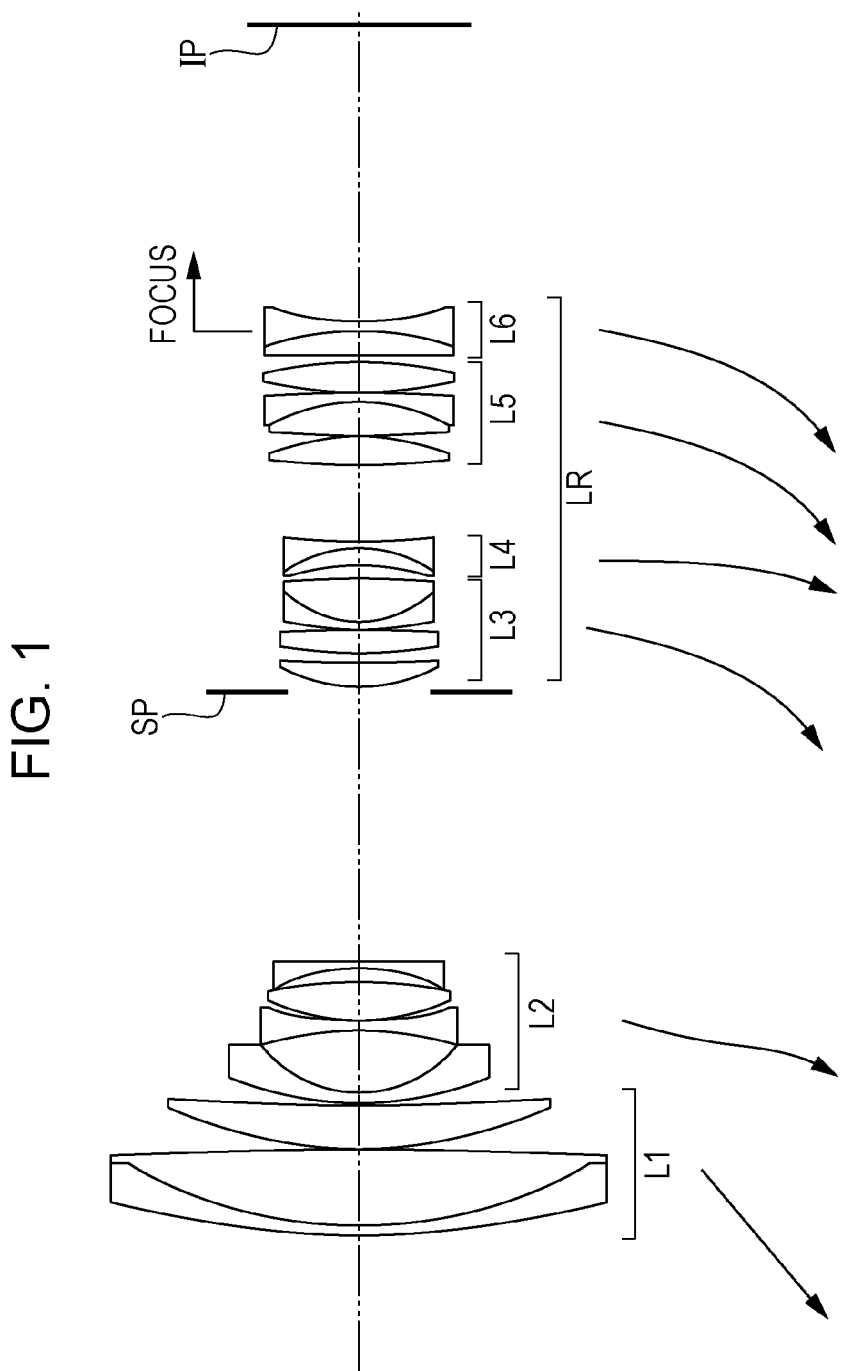
FIG. 1 is a lens cross-sectional view of a zoom lens, at the wide angle end, according to a first embodiment.
Figure 5:
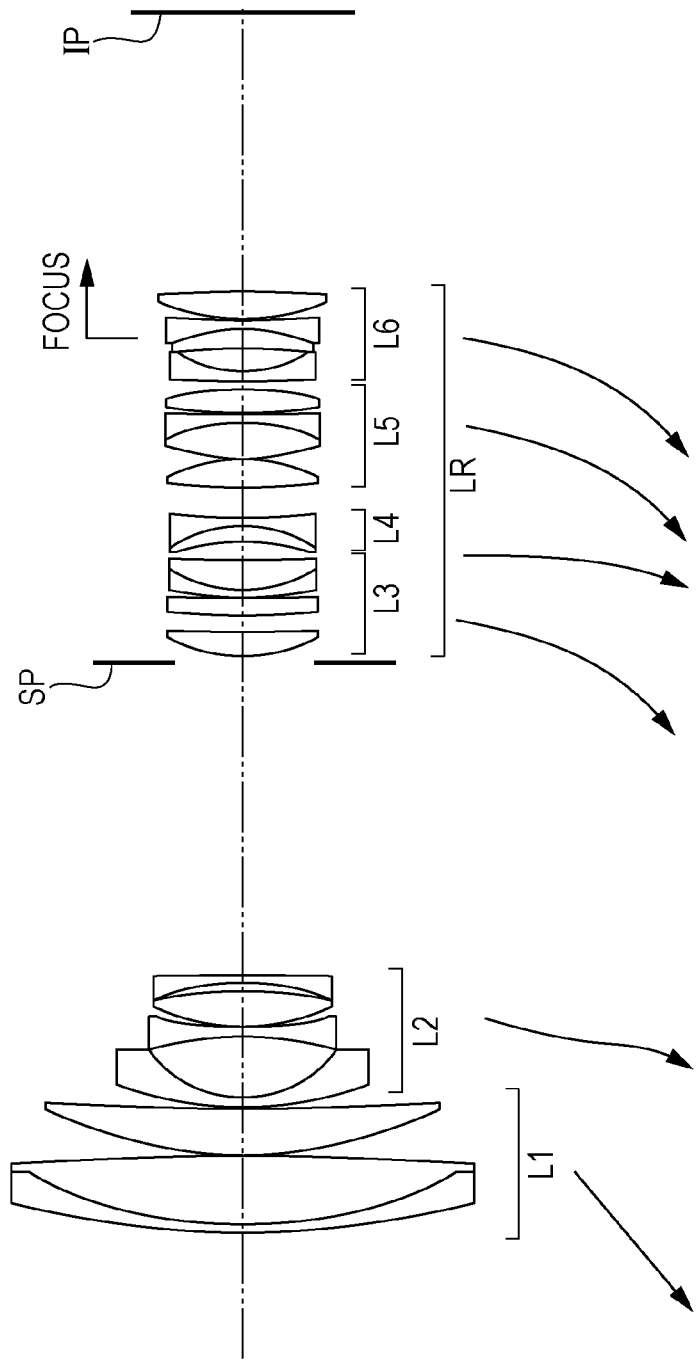
FIG. 5 is a lens cross-sectional view of a zoom lens, at the wide angle end, according to a third embodiment.

FIG. 1 is a lens cross-sectional view of a zoom lens, at the wide angle end (short focal length end), according to a first embodiment of the present invention. FIGS. 2A and 2B are longitudinal aberration diagrams of the zoom lens, at the wide angle end and the telephoto end (long focal length end), according to the first embodiment of the present invention. FIG. 3 is a lens cross-sectional view of a zoom lens, at the wide angle end, according to a second embodiment of the present invention. FIGS. 4A and 4B are longitudinal aberration diagrams of the zoom lens, at the wide angle end and the telephoto end, according to the second embodiment of the present invention. FIG. 5 is a lens cross-sectional view of a zoom lens, at the wide angle end, according to a third embodiment of the present invention. FIGS. 6A and 6B are longitudinal aberration diagrams of the zoom lens, at the wide angle end and the telephoto end, according to the third embodiment of the present invention.

Figure 9:
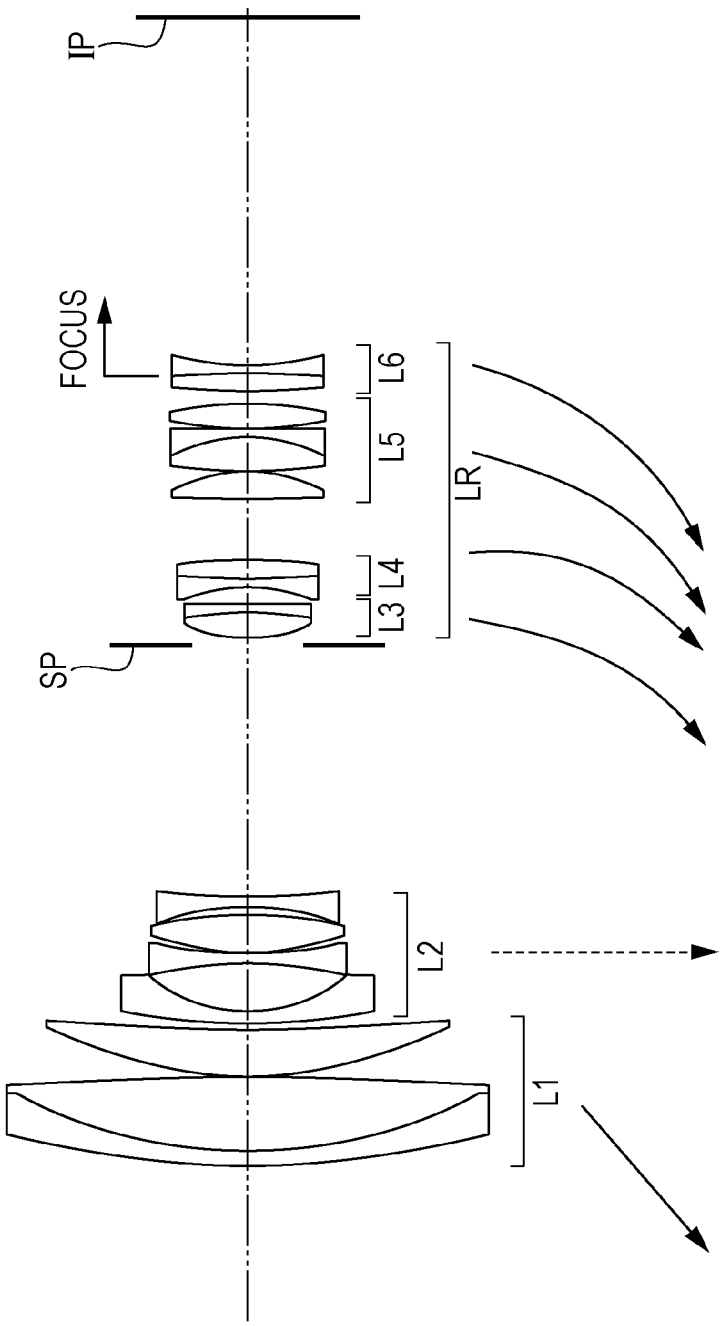
FIG. 9 is a lens cross-sectional view of a zoom lens, at the wide angle end, according to a fifth embodiment.
Figure 11:
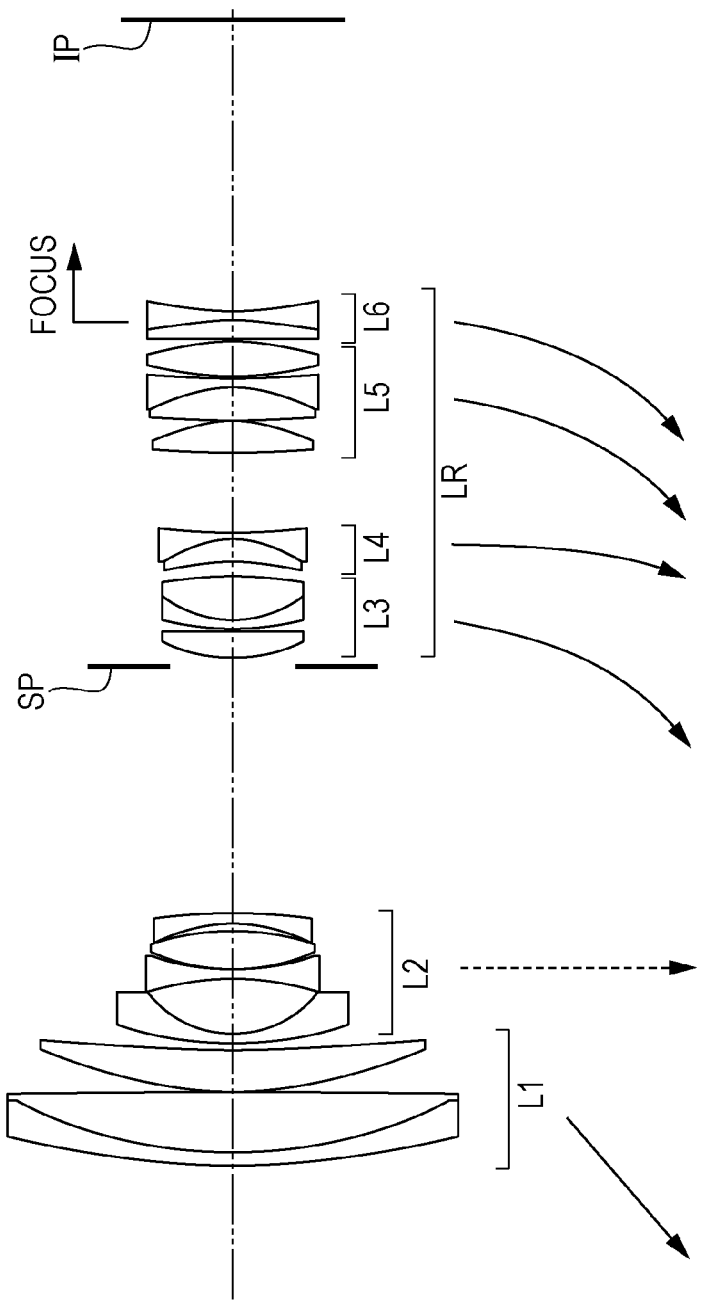
FIG. 11 is a lens cross-sectional view of a zoom lens, at the wide angle end, according to a sixth embodiment.

FIG. 7 is a lens cross-sectional view of a zoom lens, at the wide angle end, according to a fourth embodiment of the present invention. FIGS. 8A and 8B are longitudinal aberration diagrams of the zoom lens, at the wide angle end and the telephoto end, according to the fourth embodiment of the present invention. FIG. 9 is a lens cross-sectional view of a zoom lens, at the wide angle end, according to a fifth embodiment of the present invention. FIGS. 10A and 10B are longitudinal aberration diagrams of the zoom lens, at the wide angle end and the telephoto end, according to the fifth embodiment of the present invention. FIG. 11 is a lens cross-sectional view of a zoom lens, at the wide angle end, according to a sixth embodiment of the present invention. FIGS. 12A and 12B are longitudinal aberration diagrams of the zoom lens, at the wide angle end and the telephoto end, according to the sixth embodiment of the present invention.

Figure 13:
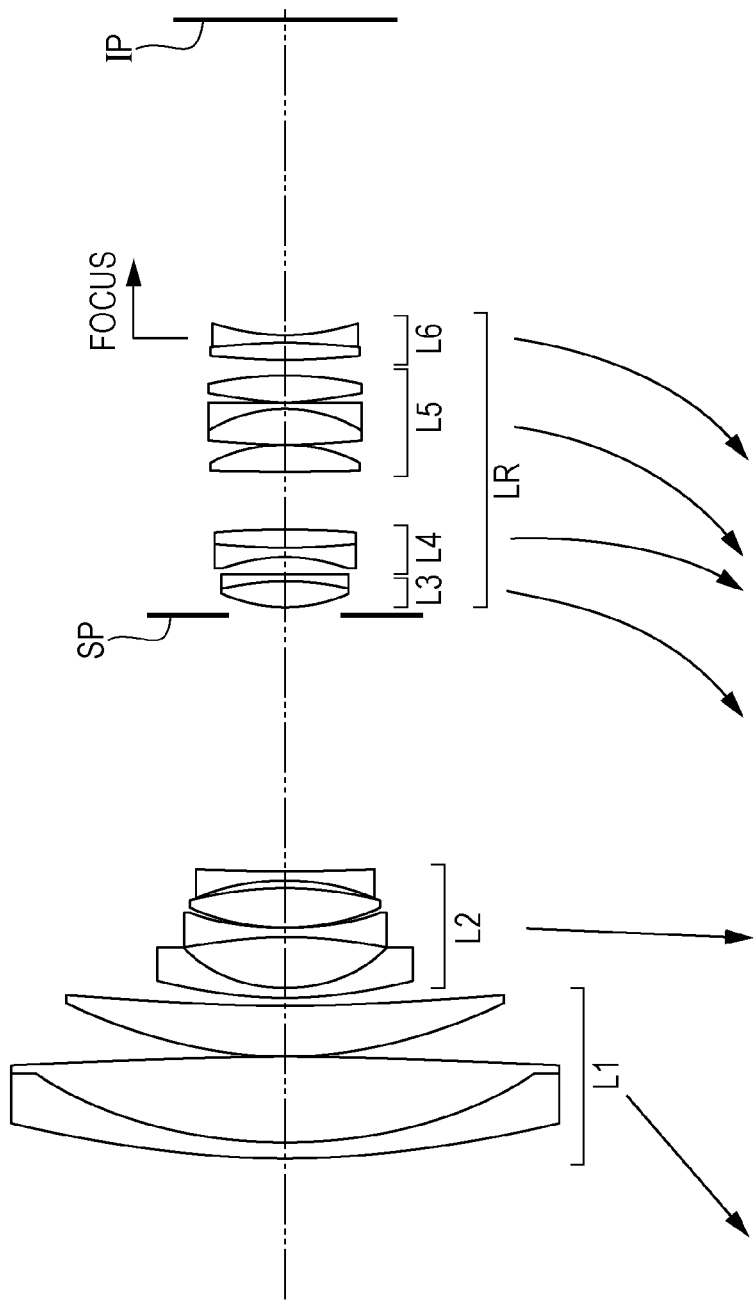
FIG. 13 is a lens cross-sectional view of a zoom lens, at the wide angle end, according to a seventh embodiment.
Figure 15:
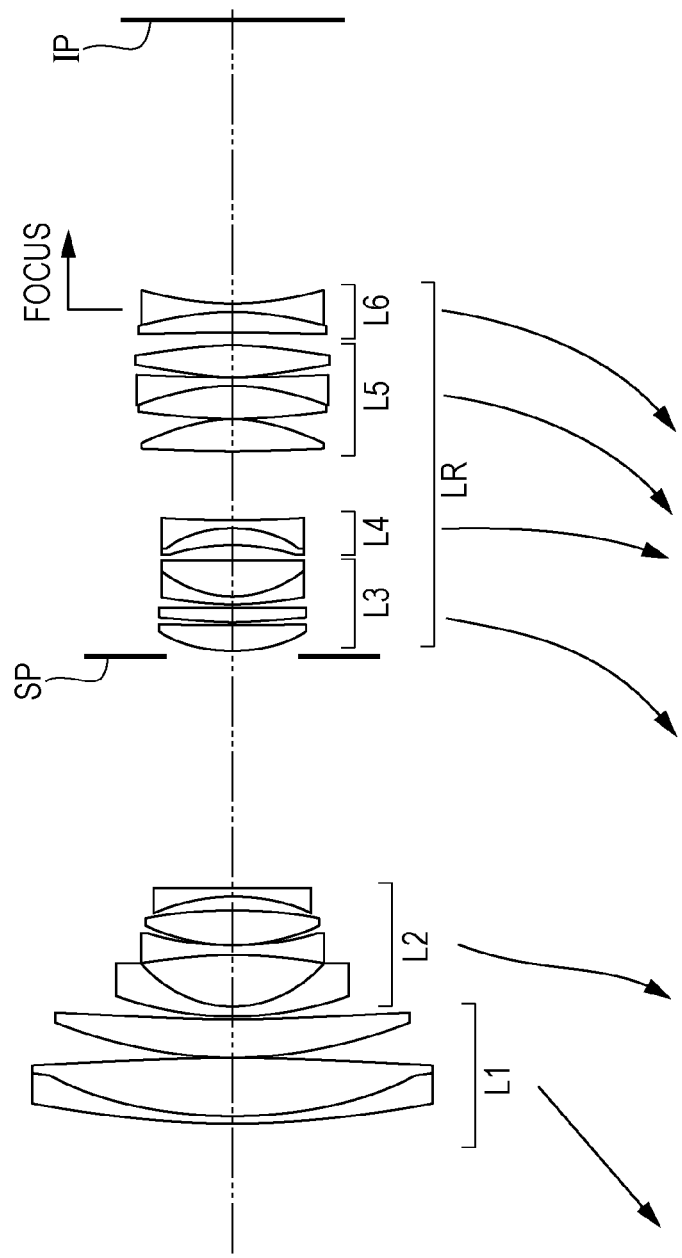
FIG. 15 is a lens cross-sectional view of a zoom lens, at the wide angle end, according to an eighth embodiment.
Figure 17:
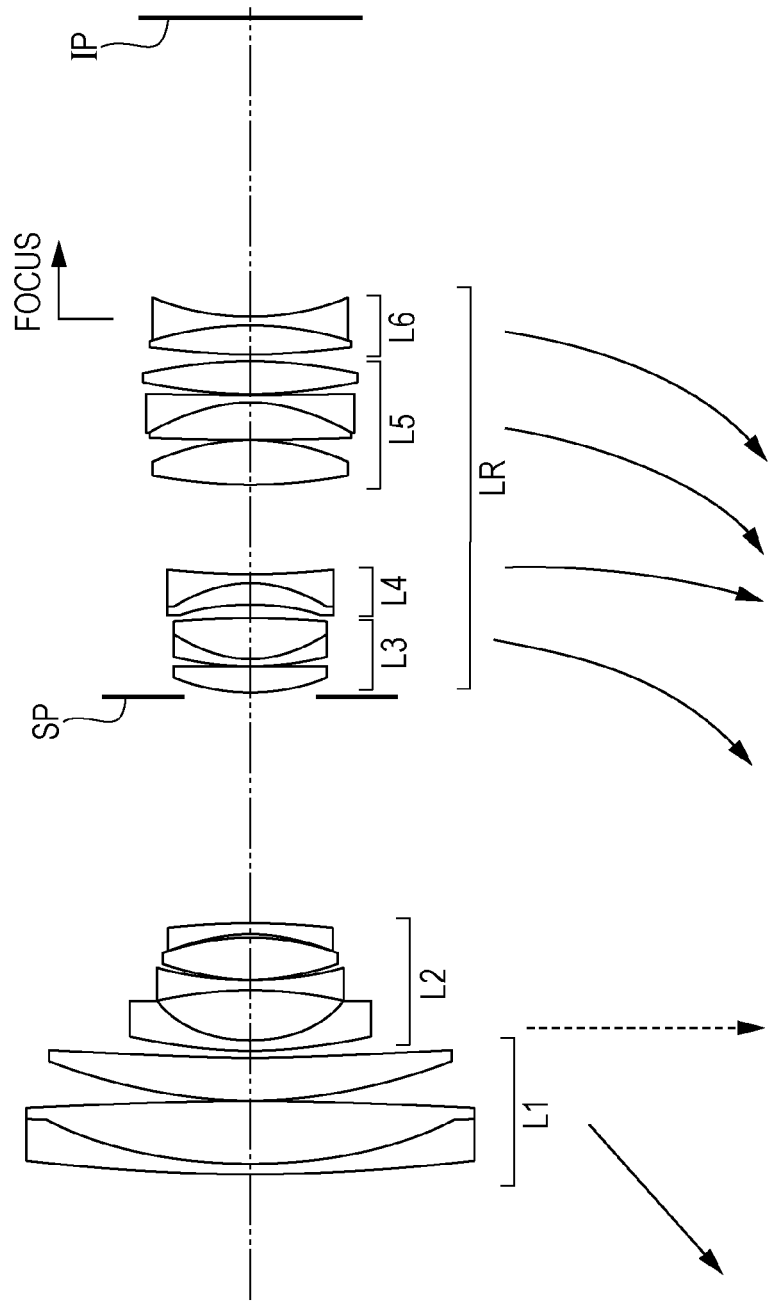
FIG. 17 is a lens cross-sectional view of a zoom lens, at the wide angle end, according to a ninth embodiment.

FIG. 13 is a lens cross-sectional view of a zoom lens, at the wide angle end, according to a seventh embodiment of the present invention. FIGS. 14A and 14B are longitudinal aberration diagrams of the zoom lens, at the wide angle end and the telephoto end, according to the seventh embodiment of the present invention. FIG. 15 is a lens cross-sectional view of a zoom lens, at the wide angle end, according to an eighth embodiment of the present invention. FIGS. 16A and 16B are longitudinal aberration diagrams of the zoom lens, at the wide angle end and the telephoto end, according to the eighth embodiment of the present invention. FIG. 17 is a lens cross-sectional view of a zoom lens, at the wide angle end, according to a ninth embodiment of the present invention. FIGS. 18A and 18B are longitudinal aberration diagrams of the zoom lens, at the wide angle end and the telephoto end, according to the ninth embodiment of the present invention.

Figure 19:
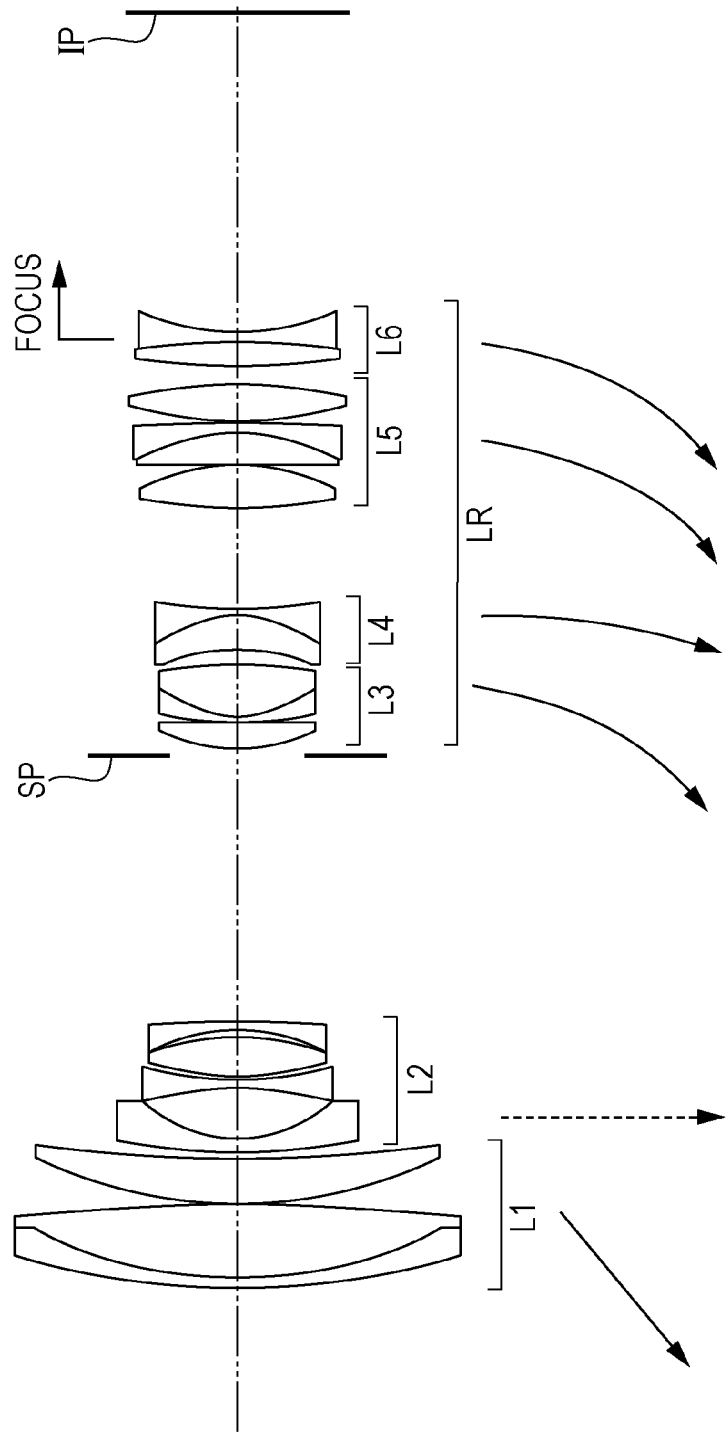
FIG. 19 is a lens cross-sectional view of a zoom lens, at the wide angle end, according to a tenth embodiment.
Figure 21:
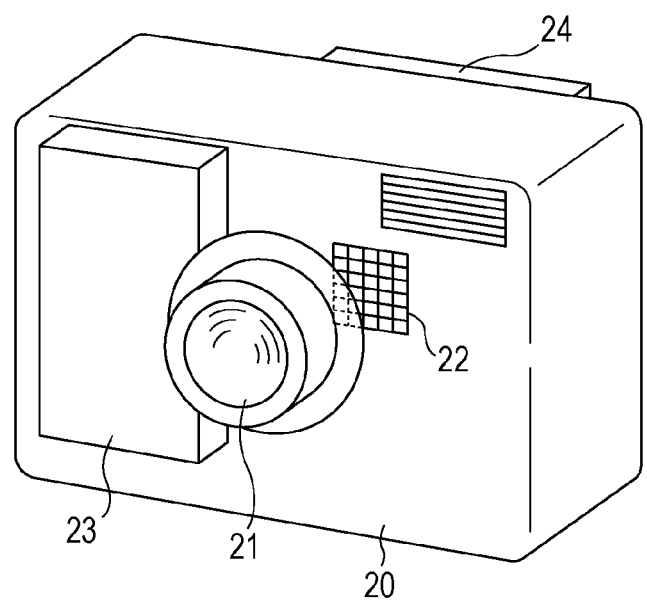
FIG. 21 is a schematic view of the relevant part of an image pickup apparatus of the present invention.

FIG. 19 is a lens cross-sectional view of a zoom lens, at the wide angle end, according to a tenth embodiment of the present invention. FIGS. 20A and 20B are longitudinal aberration diagrams of the zoom lens, at the wide angle end and the telephoto end, according to the tenth embodiment of the present invention. FIG. 21 is a schematic view of the relevant part of a video camera (image pickup apparatus) having the zoom lens of the present invention.

In lens cross-sectional views, the left side corresponds to the object side (front side), and the right side corresponds to the image side (rear side). The zoom lens according to the embodiments is an imaging lens system used in an image pickup apparatus, such as a video camera, a digital camera, etc. In lens cross-sectional views, L1 represents a first lens unit having positive refracting power, L2 represents a second lens unit having negative refracting power, L3 represents a third lens unit having positive refracting power, L4 represents a fourth lens unit having negative refracting power, L5 represents a fifth lens unit having positive refracting power, and L6 represents a sixth lens unit having negative refracting power.

Furthermore, L7 represents a seventh lens unit having positive refracting power, and LR represents a rear lens group including the third and subsequent lens units. Herein, the refracting power is the optical power, which is the reciprocal of the focal length. Furthermore, SP represents the aperture stop is disposed on the object side of the third lens unit L3, and IP represents the image plane, which corresponds to an image pickup surface of a solid-state image pickup element (photoelectric conversion element), such as a charge-coupled device (CCD) sensor or a complementary metal oxide semiconductor (CMOS) sensor, when the zoom lens is used as the imaging optical system of a video camera or a digital still camera. When the zoom lens is used in a silver-halide film camera, IP corresponds to a photosensitive surface, such as a film surface.

Movement loci of the lens units when zooming from the wide angle end to the telephoto end are indicated by arrows. Arrows denoted by "Focus" indicate the direction in which the lens units are moved when focusing from an infinitely distant object to a near object.

In spherical aberration diagrams, a solid line, a two-dot chain line, and a dashed line respectively correspond to d-line (wavelength: 587.56 nm), g-line (wavelength: 435.8 nm), and sine condition. In astigmatism diagrams, a dashed line and a solid line respectively correspond to a meridional image plane and a sagittal image plane with respect to d-line. Lateral chromatic aberrations are shown with respect to g-line. Furthermore, Fno represents the F-number, and ω represents the half angle of view. Note that, in the embodiments below, the wide angle end and the telephoto end refer to zooming positions at which magnification-varying lens units are positioned at the ends of their respective mechanically movable ranges on the optical axis.

The zoom lens of the present invention includes, in order from the object side to the image side, the first lens unit L1 to the sixth lens unit L6, which have positive, negative, positive, negative, positive, and negative refracting powers and performs focusing with the sixth lens unit L6, which makes it easy to achieve a high zoom ratio. Furthermore, the distance, at the wide angle end, between the rear principal point of the second lens unit L2 and the front principal point of the rear lens group LR including the third and subsequent lens units is increased, and the refracting powers of the lens units are appropriately set, which make it easy to achieve a wide angle of view. Thus, a small zoom lens having an imaging half angle of view of 34 degrees or more and a zoom ratio of 10:1 or more is achieved.

The zoom lens of the present invention is a so-called positive-lead type zoom lens. In zooming from the wide angle end to the telephoto end, predetermined lens units are moved such that the distances therebetween change as above. At this time, the lens units contribute to varying magnification, which makes it easy to achieve a high zoom ratio.

In particular, in the zoom lens of the present invention, in zooming from the wide angle end to the telephoto end, the first lens unit L1 is moved toward the object side. This makes it possible to reduce the overall length of the zoom lens at the wide angle end, while achieving retrofocus characteristics at the wide angle end and telephoto characteristics at the telephoto end.

Focusing from an infinitely distant object to a near object is performed by moving the sixth lens unit L6 toward the image plane side. Thus, there is no need to limit the traveling distances of the lens units in zooming to ensure a space for focusing, which makes it easy to achieve a high zoom ratio and reduce the size of the entire system.

Furthermore, in zooming from the wide angle end to the telephoto end, the sixth lens unit L6 is moved toward the object side. Because this increases the focusing sensitivity (the traveling distance of the focus when the focusing lens unit is moved) at the telephoto end compared with that at the wide angle end, the traveling distance for focusing at the telephoto end is not increased.

In the respective embodiments, the following condition is satisfied:

$$1.4 < D2Rw/fRw < 2.0 \tag{1}$$

where D2Rw is the distance, at the wide angle end, between the rear principal point of the second lens unit L2 and the front principal point of the rear lens group LR including the third and subsequent lens units, and fRw is the focal length of the rear lens group LR at the wide angle end.

Conditional Expression (1) defines the relationship between the distance, at the wide angle end, between the rear principal-point of the second lens unit L2 and the front principal point of the rear lens group LR and the combined focal length of the rear lens group LR. If the lower limit is not reached, the distance between the image point formed by the second lens unit L2 and the rear lens group LR at the wide angle end is too small, increasing the image-forming magnification of the rear lens group LR and making it difficult to achieve a wide angle of view. If the upper limit is exceeded, which is advantageous for achieving a wide angle of view though, the overall length of the lens is increased. A more preferable numerical range of Conditional Expression (1) is as follows:

$$1.42 < D2Rw/fRw < 1.70 \tag{1a}$$

Furthermore, at least one of conditional expressions below may be satisfied.

In the expressions below, f1 represents the focal length of the first lens unit L1, f2 represents the focal length of the second lens unit L2, f3 represents the focal length of the third lens unit L3, f4 represents the focal length of the fourth lens unit L4, f5 represents the focal length of the fifth lens unit L5, f6 represents the focal length of the sixth lens unit L6, fw and ft represent the focal lengths of the entire system at the wide angle end and the telephoto end, respectively, $\beta 2t$ represents the image-forming magnification of the second lens unit L2 at the telephoto end, and skt represents the distance between the final lens surface of the sixth lens unit L6 and the image plane at the telephoto end. The first lens unit L1 includes one or more positive lenses, and vd1p represents the Abbe number and θgF1p represents the partial dispersion ratio with respect to g-line and F-line of the material of at least one of the positive lenses.

The fifth lens unit L5 includes one or more positive lenses, and tvd5p represents the Abbe number and θgF5p represents the partial dispersion ratio with respect to g-line and F-line of the material of at least one of the positive lenses. The sixth lens unit L6 includes one or more positive lenses, and vd6p represents the Abbe number of the material of at least one of the positive lenses. Herein, the partial dispersion ratio θgF is expressed by the following equation:

$$\theta gF = (ng - nF)/(nF - nC)$$

where ng, nF, and nC represent the indices of refraction of the material with respect to g-line, F-line, and C-line, respectively.

Furthermore, the Abbe number νd is expressed by the following equation:

$$\nu d = (nd - 1)/(nF - nC)$$

where nd, nF, and nC represent the indices of refraction of the material with respect to d-line, F-line, and C-line, respectively.

At this time, at least one of the following conditional expressions may be satisfied:

$$1.2 < f1/\sqrt{(fw \times ft)} < 1.8 \tag{2}$$

$$-0.3 < f2/\sqrt{(fw \times ft)} < -0.18 \tag{3}$$

$$-1.6 < \beta 2t < -0.9 \tag{4}$$

$$0.9 < f3/f5 < 3.0 \tag{5}$$

$$-8.0 < f1/f2 < -5.0 \tag{6}$$

$$-1.3 < f4/\sqrt{(fw \times ft)} < -0.4 \tag{7}$$

$$-1.00 < f6/skt < -0.26 \tag{8}$$

$$70 < \nu d1p < 96 \tag{9}$$

$$0.0185 < \theta gF1p - 0.6438 + 0.001682 \times \nu d1p < 0.0510 \tag{10}$$

$$70 < \nu d5p < 96 \tag{11}$$

$$0.0185 < \theta gF5p - 0.6438 + 0.001682 \times \nu d5p < 0.051 \tag{12}$$

$$18 < \nu d6p < 26 \tag{13}$$

$$1.4 < Skw/fw < 2.5 \tag{14}$$

Next, the technical meanings of the above-described conditional expressions will be described.

Conditional Expression (2) defines the relationship between the focal length of the first lens unit L1 and the focal length of the entire system at the wide angle end and the telephoto end. Because the aberration generated in the first lens unit L1 increases in the second and subsequent lens units, it is desirable that the first lens unit L1 have a long focal length.

However, a positive-lead type zoom lens having a long focal length of the first lens unit L1 requires a large space for zooming, increasing the size of the entire system. Hence, setting an appropriate focal length of the first lens unit L1 is an important factor to achieve a high zoom ratio and reduce the size of the entire system. If the focal length of the first lens unit L1 is set too short, i.e., below the lower limit of Conditional Expression (2), which is advantageous for a reduction in size of the entire system though, high-order spherical aberration and coma increase especially at the telephoto end, which are difficult to correct.

If these aberrations are to be corrected by using a lens material having a high index of refraction for a positive lens in the first lens unit L1, because such a lens material has a relatively small anomalous dispersion, the secondary lateral chromatic aberration and axial chromatic aberration significantly increase at the telephoto end. By contrast, if the focal length of the first lens unit L1 is set too short, beyond the upper limit of Conditional Expression (2), the telephoto characteristics decrease at the telephoto end, and the traveling distance of the first lens unit L1 for varying magnification is increased. If the traveling distance of the first lens unit L1 is too large, the zoom mechanism becomes complex, increasing the size of the entire system.

Conditional Expression (3) defines the relationship between the focal length of the second lens unit L2 and the focal length of the entire system at the wide angle end and the telephoto end. The focal length of the second lens unit L2 is closely related to the effective diameter of the front lens, the zoom ratio, and correction of aberrations. Typically, the outside diameter of the lens is determined by the incident height of an on-axis ray determined by the brightness of the lens system or determined by the incident height of an off-axis ray needed to ensure sufficient light intensity of the off-axis ray. In a positive-lead type zoom lens having a high zoom ratio including a wide angle area, the incident height of the off-axis ray incident on the front lens on the wide angle side is large, and the effective diameter of the front lens is determined by this.

Hence, in order to reduce the effective diameter of the front lens, a ray having a large inclination has to be refracted by a large degree. In order for that, the negative refracting power of the second lens unit L2 may be increased to increase the combined negative refracting power of the first lens unit L1 and the second lens unit L2. If the negative refracting power of the second lens unit L2 is too low, below the lower limit of Conditional Expression (3), the effective diameter of the front lens increases, increasing the size of the entire system. If the effective diameter of the front lens increases, the incident height of a ray passing through the first lens unit L1 at the wide angle end becomes too high, generating more high-order distortion from the first lens unit L1.

Due to the high-order distortion generated from the first lens unit L1 at the wide angle end, a so-called "mustache" (wavy) distortion is significantly generated. Furthermore, in a positive-lead zoom lens, the second lens unit L2 has the largest share of varying magnification. Accordingly, the magnification-varying effect can be further increased by increasing the negative refracting power of the second lens unit L2, making it easy to achieve a high zoom ratio and reduce the traveling distance of the first lens unit L1 in zooming.

On the other hand, in a positive-lead zoom lens, the manner in which the ray passes through the second lens unit L2 significantly differs between the wide angle side and the telephoto side. Thus, variations of aberrations, especially curvature of field and distortion, are likely to occur in the second lens unit L2. Furthermore, the angle of incidence of an off-axis ray on the second lens unit L2 is quite large at the wide angle end since it is increased in the first lens unit L1.

Thus, at the wide angle end, high-order distortion and curvature of field are likely to occur in the second lens unit L2. Accordingly, if the negative refracting power of the second lens unit L2 is too high, beyond the upper limit of Conditional Expression (3), high-order distortion and curvature of field at the wide angle end increase. Moreover, because the manner in which the ray passes through the second lens unit L2 significantly changes depending on zooming, the aberrations associated with zooming significantly vary. Therefore, if the negative refracting power of the second lens unit L2 is too high, beyond the upper limit of Conditional Expression (3), variations of astigmatism and distortion due to zooming increase, making it difficult to achieve satisfactory optical performance over the entire zooming area.

Conditional Expression (4) defines the image-forming magnification of the second lens unit L2 at the telephoto end. Typically, by making the lens units have loci such that the image-forming magnification includes the 1.0× magnification (1:1 magnification) during zooming, the traveling distance of the lens units during zooming can be reduced. Accordingly, if the image-forming magnification $\beta 2t$ is set far from −1, i.e., the 1.0× magnification, beyond the upper limit of Conditional Expression (4), the relative traveling distance of the first lens unit L1 and the second lens unit L2 during zooming increases. If the relative traveling distance of the first lens unit L1 and the second lens unit L2 increases, the first lens unit L1 needs to be moved over a large distance at the telephoto end, increasing the size of the entire system.

By contrast, if the absolute value of the image-forming magnification $\beta 2t$ is too large, below the lower limit of Conditional Expression (4), the refracting power of the first lens unit L1 increases, making it difficult to set the refracting power of the first lens unit L1 within the numerical range of Conditional Expression (2).

Conditional Expression (5) defines the ratio of the focal length of the third lens unit L3 to that of the fifth lens unit L5. By making the focal length of the fifth lens unit L5 shorter than that of the third lens unit L3 to increase the positive refracting power on the object side, it becomes easy to achieve a retrofocus-type arrangement at the wide angle end and to ensure a sufficient back focus at the wide angle end.

If the focal length of the fifth lens unit L5 is too long, below the lower limit of Conditional Expression (5), it is difficult to ensure a sufficient back focus at the wide angle end. Furthermore, if the focal length of the fifth lens unit L5 is too short, beyond the upper limit of Conditional Expression (5), aberrations generated by the fifth lens unit L5 increase, increasing variations of sagittal flare and coma due to zooming, mainly generated at the wide angle end.

Conditional Expression (6) defines the ratio of the focal length of the first lens unit L1 to that of the second lens unit L2. If Conditional Expression (6) is not satisfied, and a sufficient back focus cannot be ensured, the ratio of the focal length of the first lens unit L1 to that of the second lens unit L2 may be set within the range of Conditional Expression (6). By making the second lens unit L2 have higher refracting power than the first lens unit L1, as in Conditional Expression (6), it is possible to give high combined negative refracting power to the first lens unit L1 and the second lens unit L2 at the wide angle end.

Accordingly, even if Conditional Expression (5) is not satisfied, it is possible to realize a retrofocus-type configuration as the entire system at the wide angle end. Thus, a sufficient back focus can be ensured. If Conditional Expression (5) is not satisfied, and the negative refracting power of the second lens unit L2 is low, beyond the upper limit of Conditional Expression (6), it is difficult to obtain a sufficient back focus at the wide angle end. By contrast, if the negative refracting power of the second lens unit L2 is too high, below the lower limit of Conditional Expression (6), it is difficult to satisfy Conditional Expression (3).

Conditional Expression (7) defines the focal length of the fourth lens unit L4. By increasing the negative refracting power of the fourth lens unit L4, the traveling distance of the front principal point of the rear lens group LR during zooming can be increased, making it easy to achieve a high zoom ratio. If the negative refracting power of the fourth lens unit L4 is too low, below the lower limit of Conditional Expression (7), it is difficult to achieve a high zoom ratio. By contrast, if the negative refracting power of the fourth lens unit L4 is too high, beyond the upper limit of Conditional Expression (7), the positive refracting power of the third lens unit L3 is increased to make the rear lens group LR have an appropriate refracting power, generating more high-order spherical aberration especially at the telephoto end, which is difficult to correct.

Conditional Expression (8) defines the focal length of the sixth lens unit L6. If the negative refracting power of the sixth lens unit L6 is too low, beyond the upper limit of Conditional Expression (8), the traveling distance for focusing is too large at the telephoto end, making it difficult to reduce the minimum imaging distance. If the negative refracting power of the sixth lens unit L6 is too high, below the lower limit of Conditional Expression (8), variations of spherical aberration and coma due to zooming and variation of curvature of field due to focusing increase.

Conditional Expressions (9) and (10) relate to the Abbe number $vd1p$ and the partial dispersion ratio $\theta gF1p$ of the material of one positive lens, when the first lens unit L1 includes, in order from the object side to the image side, a cemented lens composed of a negative lens and a positive lens, and a meniscus positive lens. By satisfying Conditional Expressions (9) and (10), it is possible to satisfactorily correct axial chromatic aberration and lateral chromatic aberration with ease especially at the telephoto end. Conditional Expressions (11) and (12) relate to the Abbe number $vd5p$ and the partial dispersion ratio $\theta gF5p$ of the material of one positive lens in the fifth lens unit L5. By satisfying Conditional Expressions (11) and (12), it is possible to satisfactorily correct lateral chromatic aberration with ease especially at the wide angle end.

The sixth lens unit L6 may include a cemented lens composed of a positive lens and a negative lens. Conditional Expression (13) relates to the Abbe number $vd6p$ of the material of at least one positive lens of positive lenses of the sixth lens unit L6. By satisfying Conditional Expression (13), it is possible to make the surfaces of lenses in the sixth lens unit L6 have a small curvature. Because this helps reduce the weight of the sixth lens unit L6, the operability of the zoom lens during focusing is improved.

Conditional Expression (14) relates to a ratio of the back focus at the wide angle end to the focal length of the entire system at the wide angle end. Conditional Expression (14) defines the most appropriate conditions for an image pickup apparatus requiring a long back focus, such as a single-lens reflex camera. Herein, "back focus" means the distance between the lens surface, on the image side, of the lens closest to the image side and the paraxial image plane, among the lenses having a curvature. More preferable numerical ranges of Conditional Expressions (2) to (14) are as follows:

$$1.25 < f1/\sqrt{(fw \times ft)} < 1.70 \tag{2a}$$

$$-0.28 < f2/\sqrt{(fw \times ft)} < -0.20 \tag{3a}$$

$$-1.40 < \beta 2t < -0.95 \tag{4a}$$

$$0.95 < f3/f5 < 2.70 \tag{5a}$$

$$-7.5 < f1/f2 < -5.6 \tag{6a}$$

$$-1.20 < f4/\sqrt{(fw \times ft)} < -0.45 \tag{7a}$$

$$-0.96 < f6/skt < -0.40 \tag{8a}$$

$$70 < vd1p < 95 \tag{9a}$$

$$0.019 < \theta gF1p - 0.6438 + 0.001682 \times vd1p < 0.050 \tag{10a}$$

$$70 < vd5p < 95 \tag{11a}$$

$$0.019 < \theta gF5p - 0.6438 + 0.001682 \times vd5p < 0.050 \tag{12a}$$

$$18.5 < vd6p < 25.7 \tag{13a}$$

$$1.6 < Skw/fw < 2.4 \tag{14a}$$

In the embodiments, the second lens unit L2 may include three negative lenses and one or two positive lenses. Because the second lens unit L2 has the highest absolute value of the refracting power of all the lens units, by increasing the number of lenses and sharing the refracting power among these lenses, aberrations are suppressed. The second lens unit L2 may include at least one aspheric surface lens. This makes it easy to satisfactorily correct curvature of field especially at the wide angle end.

The third lens unit L3 may include a cemented lens composed of a positive lens and a negative lens. The third lens unit L3 may include at least one aspheric surface lens. This makes it easy to satisfactorily correct spherical aberration especially over the entire zooming area.

The fourth lens unit L4 may include a cemented lens composed of a positive lens and a negative lens. Furthermore, by configuring the fourth lens unit L4 such that it has a refracting power within the numerical range of Conditional Expression (7) and such that it includes at least one aspheric surface lens, it becomes easy to move the image position, i.e., to correct image blur, by moving the fourth lens unit L4 in a direction having a directional component perpendicular to the optical axis.

The fifth lens unit L5 may include three positive lenses and one negative lens. Because the fifth lens unit L5 has a high refracting power to achieve a wide angle view, by increasing the number of lenses and sharing the refracting power among these lenses, aberrations are suppressed. The fifth lens unit L5 may include at least one aspheric surface lens. This makes it easy to satisfactorily correct distortion especially at the wide angle end. Furthermore, a seventh lens unit having positive refracting power, which is not moved during zooming, may be disposed on the image side of the sixth lens unit L6. This makes it easy to reduce variations of aberrations caused by zooming.

In the present invention, the aperture stop is moved simultaneously with the third lens unit L3. However, even if the stop is moved independently of the third lens unit L3, advantages of the present invention can be achieved.

As has been described above, according to the embodiments, a small zoom lens having a high zoom ratio, having a sufficient back focus while including a wide angle area, and having satisfactory optical performance over the entire zoom range and object length can be achieved.

Next, an embodiment of a digital camera that uses the zoom lens according to any one of the above embodiments as an imaging optical system will be described using FIG. 21. FIG. 21 illustrates a camera body 20, an image-pickup optical system 21 including the zoom lens of the present invention, a solid-state image pickup element 22, such as a CCD, that picks up an object image formed by the image-pickup optical system 21, a recording unit 23 that stores the object image received by the solid-state image pickup element 22, and a finder 24 through which the object image on a display device (not shown) is observed.

The display device is formed of a liquid crystal panel or the like, on which the object image formed on the solid-state image pickup element 22 is displayed. By using the zoom lens of the present invention in an optical apparatus, such as a video camera, an image pickup apparatus having a small zoom lens with a high zoom ratio is realized.

The zoom lens of the present invention may be used in a mirror-less single-lens reflex camera that does not have a quick-return mirror.

Although the embodiments of the present invention have been described above, the present invention is not limited to the above-described embodiments, but may be variously modified and changed within a scope not departing from the spirit of the invention.

Next, Numerical Embodiments 1 to 10 corresponding to the first to tenth embodiments of the present invention will be presented. In the respective numerical embodiments, "i" represents the surface number counted from the object side, "ri" represents the radius of curvature of the i-th optical surface (i-th surface), "di" represents the on-axis distance between the i-th surface and the (i+1)-th surface, "ndi" and "vdi" respectively represent the index of refraction and Abbe number of the material of the i-th optical member with respect to d-line. The focal length and F-number for wide angle (wide angle end), intermediate (intermediate zooming position), and telephoto (telephoto end) are shown. Furthermore, an asterisk (*) is indicated on the side of the surface number of the aspheric surfaces. Furthermore, R represents the paraxial radius of curvature, K denotes the eccentricity, A4, A6, A8, and A10 denote the aspheric surface coefficient.

The aspheric surface shape is expressed by the following expression:

$$X = (H^2/R)/[1 + \{1 - (1+K)(H/R)^2\}^{1/2}] + A4 \cdot H^4 + A6 \cdot H^6 + A8 \cdot H^8 + A10 \cdot H^{10}$$

where x is the displacement in the optical axis direction at a height h from the optical axis, with respect to the surface vertex.

Note that "E±XX" in each aspheric surface coefficient means "×10±XX". Table 1 shows the correspondence of Numerical Embodiments 1 to 10 to Conditional Expressions (1) to (14).

Numerical Embodiment 1

| Surface Number | r | d | nd | vd |
|---|---|---|---|---|
| 1 | 115.267 | 1.10 | 1.74950 | 35.3 |
| 2 | 56.531 | 9.15 | 1.49700 | 81.5 |
| 3 | −462.423 | 0.12 | | |
| 4 | 56.973 | 5.10 | 1.49700 | 81.5 |
| 5 | 339.321 | (variable) | | |
| 6* | 45.434 | 1.20 | 1.77250 | 49.6 |
| 7 | 15.218 | 7.47 | | |
| 8 | −37.803 | 1.09 | 1.81600 | 46.6 |
| 9 | 36.183 | 0.15 | | |
| 10 | 27.918 | 4.60 | 1.84666 | 23.9 |
| 11 | −47.920 | 1.57 | | |
| 12 | −23.870 | 0.87 | 1.77250 | 49.6 |
| 13 | −245.672 | (variable) | | |
| 14 (stop) | ∞ | 0.66 | | |
| 15 | 21.615 | 2.76 | 1.64769 | 33.8 |
| 16* | 141.673 | 1.23 | | |
| 17 | 55.773 | 2.71 | 1.58144 | 40.8 |
| 18 | −333.154 | 0.09 | | |
| 19 | 42.193 | 0.90 | 1.80518 | 25.4 |
| 20 | 12.349 | 5.01 | 1.51633 | 64.1 |
| 21 | −275.204 | (variable) | | |
| 22* | −29.049 | 2.07 | 1.85026 | 32.3 |
| 23 | −15.359 | 0.76 | 1.69680 | 55.5 |
| 24 | 81.782 | (variable) | | |
| 25* | 83.000 | 3.49 | 1.48749 | 70.2 |
| 26 | −26.399 | 0.00 | | |
| 27 | 117.198 | 4.05 | 1.49700 | 81.5 |
| 28 | −23.283 | 1.05 | 1.84666 | 23.9 |
| 29 | −152.463 | 0.14 | | |
| 30 | 58.079 | 3.55 | 1.80100 | 35.0 |
| 31 | −50.647 | (variable) | | |
| 32 | −372.933 | 2.79 | 1.84666 | 23.9 |
| 33 | −34.747 | 1.07 | 1.81600 | 46.6 |
| 34 | 33.628 | (variable) | | |
| image plane | ∞ | | | |

Aspheric Surface Data

6th surface

K = 0.00000e+000    A4 = 1.41662e−006    A6 = 4.06417e−009
A8 = −5.44223e−011  A10 = 1.86232e−013

16th surface

K = 0.00000e+000    A4 = 1.07693e−005    A6 = 1.03287e−008
A8 = −1.30214e−011

22nd surface

K = 0.00000e+000    A4 = 3.01237e−006    A6 = 3.34207e−009
A8 = −2.22213e−010  A10 = 2.46915e−012

25th surface

K = 0.00000e+000    A4 = −1.82792e−005   A6 = 2.52931e−008
A8 = −5.32668e−011

| | wide angle | intermediate | telephoto |
|---|---|---|---|
| focal length | 18.75 | 59.52 | 270.67 |
| F-number | 3.18 | 4.69 | 5.88 |
| angle of view | 36.08 | 12.93 | 2.89 |
| d5 | 0.41 | 27.22 | 58.52 |
| d13 | 32.24 | 15.49 | 0.47 |
| d21 | 1.82 | 7.39 | 10.06 |
| d24 | 9.16 | 3.59 | 0.92 |
| d31 | 0.94 | 0.96 | 0.91 |
| d34 | 35.76 | 56.72 | 71.52 |

Numerical Embodiment 2

| Surface Number | r | d | nd | vd |
|---|---|---|---|---|
| 1 | 115.594 | 1.25 | 1.74950 | 35.3 |
| 2 | 58.382 | 8.50 | 1.49700 | 81.5 |
| 3 | -543.881 | 0.12 | | |
| 4 | 56.650 | 5.00 | 1.49700 | 81.5 |
| 5 | 255.169 | (variable) | | |
| 6* | 40.034 | 1.25 | 1.77250 | 49.6 |
| 7 | 14.681 | 7.87 | | |
| 8 | -36.261 | 1.25 | 1.81600 | 46.6 |
| 9 | 40.861 | 0.15 | | |
| 10 | 29.123 | 4.50 | 1.84666 | 23.9 |
| 11 | -53.894 | 1.25 | | |
| 12 | -26.719 | 1.25 | 1.77250 | 49.6 |
| 13 | -703.034 | (variable) | | |
| 14 (stop) | ∞ | 0.75 | | |
| 15 | 24.464 | 3.31 | 1.64769 | 33.8 |
| 16* | -301.124 | 0.10 | | |
| 17 | 39.789 | 1.00 | 1.80518 | 25.4 |
| 18 | 14.477 | 5.28 | 1.51633 | 64.1 |
| 19 | -41.259 | (variable) | | |
| 20* | -23.416 | 2.30 | 1.80518 | 25.4 |
| 21 | -16.046 | 1.00 | 1.64000 | 60.1 |
| 22 | 126.554 | (variable) | | |
| 23* | 148.132 | 3.50 | 1.48749 | 70.2 |
| 24 | -21.599 | 0.10 | | |
| 25 | -267.802 | 4.20 | 1.49700 | 81.5 |
| 26 | -17.543 | 1.25 | 1.84666 | 23.9 |
| 27 | -113.528 | 0.10 | | |
| 28 | 77.730 | 3.20 | 1.85026 | 32.3 |
| 29 | -43.144 | (variable) | | |
| 30 | -584.224 | 2.50 | 1.80809 | 22.8 |
| 31 | -39.009 | 1.00 | 1.81600 | 46.6 |
| 32 | 29.031 | (variable) | | |
| 33 | -113.308 | 2.00 | 1.48749 | 70.2 |
| 34 | -48.950 | 35.42 | | |
| image plane | ∞ | | | |

Aspheric Surface Data

6th surface

K = 0.00000e+000  A4 = 6.67557e-007  A6 = 2.58408e-009
A8 = -4.37755e-011  A10 = 1.05064e-013

16th surface

K = 0.00000e+000  A4 = 1.06810e-005  A6 = 6.59227e-009
A8 = -5.28137e-011

20th surface

K = 0.00000e+000  A4 = 1.21078e-005  A6 = 1.92087e-008
A8 = -7.95974e-010  A10 = 6.32000e-012

23rd surface

K = 0.00000e+000  A4 = -2.62525e-005  A6 = 2.74013e-008
A8 = 6.20287e-011

| | wide angle | intermediate | telephoto |
|---|---|---|---|
| focal length | 18.69 | 60.72 | 270.83 |
| F-number | 3.50 | 4.80 | 5.88 |
| angle of view | 36.16 | 12.68 | 2.89 |
| d5 | 0.35 | 31.36 | 62.38 |
| d13 | 35.80 | 16.16 | 0.54 |
| d19 | 2.03 | 5.53 | 7.29 |
| d22 | 6.49 | 2.99 | 1.24 |
| d29 | 0.97 | 3.16 | 3.55 |
| d32 | 3.00 | 20.45 | 35.68 |

Numerical Embodiment 3

| Surface Number | r | d | nd | vd |
|---|---|---|---|---|
| 1 | 122.431 | 0.99 | 1.83400 | 37.2 |
| 2 | 60.793 | 8.72 | 1.49700 | 81.5 |
| 3 | -392.652 | 0.12 | | |
| 4 | 58.524 | 5.91 | 1.49700 | 81.5 |
| 5 | 426.044 | (variable) | | |
| 6* | 48.981 | 1.20 | 1.77250 | 49.6 |
| 7 | 14.829 | 7.80 | | |
| 8 | -37.698 | 1.25 | 1.81600 | 46.6 |
| 9 | 50.174 | 0.15 | | |
| 10 | 31.714 | 4.34 | 1.84666 | 23.9 |
| 11 | -57.423 | 1.09 | | |
| 12 | -28.580 | 1.01 | 1.77250 | 49.6 |
| 13 | -220.269 | (variable) | | |
| 14 (stop) | ∞ | 0.87 | | |
| 15 | 24.523 | 2.73 | 1.64769 | 33.8 |
| 16* | 278.118 | 2.24 | | |
| 17 | 76.181 | 1.99 | 1.58144 | 40.8 |
| 18 | 1771.317 | 0.26 | | |
| 19 | 52.020 | 0.90 | 1.80518 | 25.4 |
| 20 | 17.446 | 3.97 | 1.51633 | 64.1 |
| 21 | 205.969 | (variable) | | |
| 22* | -29.159 | 2.16 | 1.85026 | 32.3 |
| 23 | -16.343 | 0.91 | 1.69680 | 55.5 |
| 24 | 89.053 | (variable) | | |
| 25* | 88.343 | 3.38 | 1.48749 | 70.2 |
| 26 | -21.238 | 0.00 | | |
| 27 | 26.255 | 4.68 | 1.49700 | 81.5 |
| 28 | -25.486 | 1.11 | 1.84666 | 23.9 |
| 29 | 354.962 | 0.20 | | |
| 30 | 78.659 | 2.90 | 1.80100 | 35.0 |
| 31 | -42.560 | (variable) | | |
| 32 | 154.242 | 1.20 | 1.88300 | 40.8 |
| 33 | 16.960 | 3.00 | | |
| 34 | -72.975 | 2.43 | 1.80518 | 25.4 |
| 35 | -25.285 | 1.20 | 1.88300 | 40.8 |
| 36 | 219.033 | 0.15 | | |
| 37 | 29.491 | 3.40 | 1.69895 | 30.1 |
| 38 | -222.141 | (variable) | | |
| image plane | ∞ | | | |

Aspheric Surface Data

6th surface

K = 0.00000e+000  A4 = 1.17915e-006  A6 = 8.18325e-009
A8 = -7.65482e-011  A10 = 1.27716e-013

16th surface

K = 0.00000e+000  A4 = 1.18351e-005  A6 = -4.59099e-009
A8 = 6.07038e-011

22nd surface

K = 0.00000e+000  A4 = 1.02052e-005  A6 = -5.73784e-008
A8 = 9.44671e-011  A10 = 1.15157e-012

25th surface

K = 0.00000e+000  A4 = -3.76395e-005  A6 = 7.73456e-008
A8 = -2.24833e-010

| | wide angle | intermediate | telephoto |
|---|---|---|---|
| focal length | 18.67 | 54.99 | 299.50 |
| F-number | 3.39 | 4.79 | 5.88 |
| angle of view | 36.18 | 13.95 | 2.61 |
| d5 | 0.16 | 28.20 | 64.25 |
| d13 | 39.73 | 21.34 | 0.55 |
| d21 | 2.15 | 4.22 | 5.19 |
| d24 | 4.13 | 2.06 | 1.09 |
| d31 | 1.06 | 0.93 | 0.86 |
| d38 | 35.61 | 60.09 | 78.93 |

Numerical Embodiment 4

| Surface Number | r | d | nd | νd |
|---|---|---|---|---|
| 1 | 104.956 | 2.00 | 1.80610 | 33.3 |
| 2 | 57.843 | 9.20 | 1.49700 | 81.5 |
| 3 | −395.223 | 0.10 | | |
| 4 | 53.823 | 5.60 | 1.49700 | 81.5 |
| 5 | 259.317 | (variable) | | |
| 6 | 55.974 | 1.20 | 1.88300 | 40.8 |
| 7 | 19.148 | 4.70 | | |
| 8 | −72.361 | 1.20 | 1.77250 | 49.6 |
| 9 | 25.866 | 3.20 | 1.68893 | 31.1 |
| 10 | −239.696 | 1.90 | | |
| 11 | −33.205 | 1.00 | 1.83481 | 42.7 |
| 12 | 24.506 | 2.50 | 1.84666 | 23.9 |
| 13 | −136.787 | (variable) | | |
| 14 (stop) | ∞ | 1.00 | | |
| 15 | 28.747 | 3.20 | 1.71300 | 53.9 |
| 16 | −21.749 | 1.00 | 1.85026 | 32.3 |
| 17* | −109.187 | (variable) | | |
| 18 | −40.784 | 1.13 | 1.65160 | 58.5 |
| 19 | 32.120 | 2.25 | 1.85026 | 32.3 |
| 20 | 101.352 | (variable) | | |
| 21* | 136.686 | 3.60 | 1.60300 | 65.4 |
| 22 | −27.798 | 0.10 | | |
| 23 | 45.798 | 4.70 | 1.49700 | 81.5 |
| 24 | −24.721 | 1.00 | 1.80610 | 33.3 |
| 25 | 340.461 | 0.10 | | |
| 26 | 50.000 | 3.50 | 1.60300 | 65.4 |
| 27 | −51.026 | (variable) | | |
| 28 | 103.719 | 2.00 | 1.80809 | 22.8 |
| 29 | −109.878 | 1.10 | 1.83481 | 42.7 |
| 30 | 28.098 | (variable) | | |
| image plane | ∞ | | | |

Aspheric Surface Data

17th surface

K = 0.00000e+000   A4 = 6.14631e−006   A6 = 3.62393e−009
A8 = −7.35936e−011

21st surface

K = 0.00000e+000   A4 = −1.05962e−005   A6 = −1.59212e−009
A8 = 2.34394e−011

| | wide angle | intermediate | telephoto |
|---|---|---|---|
| focal length | 18.54 | 49.15 | 194.16 |
| F-number | 3.22 | 4.22 | 5.66 |
| angle of view | 36.36 | 15.52 | 4.02 |
| d5 | 1.00 | 27.02 | 53.04 |
| d13 | 23.28 | 12.13 | 0.99 |
| d17 | 2.00 | 7.55 | 13.09 |
| d20 | 15.82 | 8.52 | 1.23 |
| d27 | 2.15 | 2.44 | 1.00 |
| d30 | 36.33 | 48.94 | 63.28 |

Numerical Embodiment 5

| Surface Number | r | d | nd | νd |
|---|---|---|---|---|
| 1 | 111.209 | 2.00 | 1.80610 | 33.3 |
| 2 | 61.478 | 9.20 | 1.49700 | 81.5 |
| 3 | −328.477 | 0.10 | | |
| 4 | 54.425 | 5.60 | 1.49700 | 81.5 |
| 5 | 206.846 | (variable) | | |
| 6 | 82.870 | 1.20 | 1.88300 | 40.8 |
| 7 | 17.562 | 6.20 | | |
| 8 | −48.213 | 1.20 | 1.88300 | 40.8 |
| 9 | 63.063 | 0.10 | | |
| 10 | 32.914 | 4.80 | 1.84666 | 23.9 |
| 11 | −47.188 | 1.00 | | |
| 12 | −30.254 | 1.00 | 1.60300 | 65.4 |
| 13 | 79.574 | (variable) | | |
| 14 (stop) | ∞ | 1.00 | | |
| 15 | 19.573 | 3.20 | 1.51633 | 64.1 |
| 16 | −35.591 | 1.00 | 1.80400 | 46.6 |
| 17* | 356.624 | (variable) | | |
| 18 | −23.660 | 1.13 | 1.62041 | 60.3 |
| 19 | 102.735 | 2.25 | 1.80100 | 35.0 |
| 20 | −89.943 | (variable) | | |
| 21* | 108.954 | 3.30 | 1.60300 | 65.4 |
| 22 | −21.060 | 0.10 | | |
| 23 | 112.509 | 4.20 | 1.49700 | 81.5 |
| 24 | −19.644 | 1.00 | 1.80610 | 33.3 |
| 25 | −1936.602 | 0.10 | | |
| 26 | 50.000 | 3.10 | 1.60300 | 65.4 |
| 27 | −51.026 | (variable) | | |
| 28 | 133.696 | 2.00 | 1.92286 | 18.9 |
| 29 | −203.728 | 1.10 | 1.88300 | 40.8 |
| 30 | 32.244 | (variable) | | |
| image plane | ∞ | | | |

Aspheric Surface Data

17th surface

K = 0.00000e+000   A4 = 7.68781e−006   A6 = 4.33121e−008
A8 = −3.05233e−010

21st surface

K = 0.00000e+000   A4 = −2.30316e−005   A6 = 3.15515e−008
A8 = −1.52565e−010

| | wide angle | intermediate | telephoto |
|---|---|---|---|
| focal length | 18.54 | 50.09 | 194.17 |
| F-number | 3.45 | 4.48 | 5.66 |
| angle of view | 36.36 | 15.24 | 4.02 |
| d5 | 1.00 | 28.01 | 55.02 |
| d13 | 31.30 | 16.45 | 1.60 |
| d17 | 2.00 | 3.83 | 5.65 |
| d20 | 7.66 | 4.33 | 1.00 |
| d27 | 1.61 | 1.59 | 1.00 |
| d30 | 43.02 | 59.40 | 76.33 |

Numerical Embodiment 6

| Surface Number | r | d | nd | νd |
|---|---|---|---|---|
| 1 | 112.705 | 1.25 | 1.73800 | 32.3 |
| 2 | 55.432 | 7.64 | 1.49700 | 81.5 |
| 3 | −2753.053 | 0.12 | | |
| 4 | 56.614 | 5.02 | 1.60300 | 65.4 |
| 5 | 210.789 | (variable) | | |
| 6* | 54.671 | 1.20 | 1.88300 | 40.8 |
| 7 | 13.657 | 6.67 | | |
| 8 | −33.734 | 1.19 | 1.88300 | 40.8 |
| 9 | 35.557 | 0.15 | | |
| 10 | 28.953 | 4.58 | 1.84666 | 23.9 |
| 11 | −30.521 | 0.93 | | |
| 12 | −20.391 | 1.20 | 1.77250 | 49.6 |
| 13 | −68.003 | (variable) | | |
| 14 (stop) | ∞ | 1.00 | | |
| 15 | 22.967 | 3.31 | 1.68893 | 31.1 |
| 16* | −947.226 | 0.15 | | |
| 17 | 37.902 | 1.07 | 1.80518 | 25.4 |
| 18 | 13.701 | 5.39 | 1.51633 | 64.1 |
| 19 | −61.032 | (variable) | | |
| 20* | −29.117 | 2.66 | 1.85026 | 32.3 |
| 21 | −14.230 | 1.00 | 1.72916 | 54.7 |
| 22 | 107.497 | (variable) | | |
| 23* | 120.621 | 3.76 | 1.48749 | 70.2 |
| 24 | −20.796 | 0.00 | | |
| 25 | 71.956 | 4.17 | 1.49700 | 81.5 |
| 26 | −20.210 | 1.20 | 1.84666 | 23.9 |
| 27 | 147.624 | 0.32 | | |

-continued

| | | | | |
|---|---|---|---|---|
| 28 | 49.357 | 4.06 | 1.71736 | 29.5 |
| 29 | −41.276 | (variable) | | |
| 30 | −247.069 | 2.22 | 1.92286 | 18.9 |
| 31 | −48.567 | 1.19 | 1.88300 | 40.8 |
| 32 | 45.614 | (variable) | | |
| image plane | ∞ | | | |

Aspheric Surface Data

6th surface

K = 0.00000e+000   A4 = 6.30178e−006   A6 = 1.50511e−008
A8 = −2.05234e−010   A10 = 6.44127e−013

16th surface

K = 0.00000e+000   A4 = 1.05568e−005   A6 = 1.21789e−008
A8 = −5.63360e−011

20th surface

K = 0.00000e+000   A4 = 5.19379e−006   A6 = 5.86158e−009
A8 = −4.04284e−010   A10 = 2.91147e−012

23rd surface

K = 0.00000e+000   A4 = −2.55268e−005   A6 = 1.94963e−008
A8 = −1.64421e−011

| | wide angle | intermediate | telephoto |
|---|---|---|---|
| focal length | 16.53 | 54.38 | 237.95 |
| F-number | 3.42 | 4.72 | 5.88 |
| angle of view | 39.56 | 14.10 | 3.29 |
| d5 | 0.96 | 31.96 | 62.96 |
| d13 | 30.58 | 12.66 | 0.99 |
| d19 | 1.95 | 6.83 | 10.61 |
| d22 | 9.85 | 4.97 | 1.19 |
| d29 | 0.50 | 1.99 | 0.97 |
| d32 | 35.81 | 52.23 | 64.92 |

Numerical Embodiment 7

| Surface Number | r | d | nd | vd |
|---|---|---|---|---|
| 1 | 132.300 | 2.00 | 1.80610 | 33.3 |
| 2 | 60.730 | 10.50 | 1.49700 | 81.5 |
| 3 | −442.264 | 0.10 | | |
| 4 | 57.694 | 6.20 | 1.60300 | 65.4 |
| 5 | 293.297 | (variable) | | |
| 6 | 62.842 | 1.20 | 1.88300 | 40.8 |
| 7 | 17.194 | 6.20 | | |
| 8 | −44.702 | 1.20 | 1.88300 | 40.8 |
| 9 | 37.538 | 0.10 | | |
| 10 | 29.115 | 4.80 | 1.84666 | 23.9 |
| 11 | −43.870 | 1.00 | | |
| 12 | −28.464 | 1.00 | 1.60300 | 65.4 |
| 13 | 148.350 | (variable) | | |
| 14 (stop) | ∞ | 1.00 | | |
| 15 | 18.675 | 3.20 | 1.51633 | 64.1 |
| 16 | −33.730 | 1.00 | 1.83481 | 42.7 |
| 17* | 1510.611 | (variable) | | |
| 18 | −22.929 | 1.13 | 1.62041 | 60.3 |
| 19 | 74.851 | 2.25 | 1.80610 | 33.3 |
| 20 | −115.242 | (variable) | | |
| 21* | 123.011 | 3.30 | 1.60300 | 65.4 |
| 22 | −19.574 | 0.10 | | |
| 23 | 111.247 | 4.20 | 1.49700 | 81.5 |
| 24 | −18.838 | 1.00 | 1.80610 | 33.3 |
| 25 | −749.449 | 0.10 | | |
| 26 | 50.000 | 3.10 | 1.60300 | 65.4 |
| 27 | −51.026 | (variable) | | |

-continued

| | | | | |
|---|---|---|---|---|
| 28 | 109.537 | 2.00 | 1.80809 | 22.8 |
| 29 | −103.657 | 1.10 | 1.83481 | 42.7 |
| 30 | 30.074 | (variable) | | |
| image plane | ∞ | | | |

Aspheric Surface Data

17th surface

K = 0.00000e+000   A4 = 9.37673e−006   A6 = 6.44817e−008
A8 = −5.16882e−010

21st surface

K = 0.00000e+000   A4 = −2.63449e−005   A6 = 4.22269e−008
A8 = −2.50996e−010

| | wide angle | intermediate | telephoto |
|---|---|---|---|
| focal length | 16.81 | 47.39 | 194.13 |
| F-number | 3.32 | 4.46 | 5.66 |
| angle of view | 39.07 | 16.07 | 4.02 |
| d5 | 1.00 | 28.34 | 55.55 |
| d13 | 31.64 | 16.25 | 1.29 |
| d17 | 2.00 | 2.10 | 4.34 |
| d20 | 7.17 | 4.76 | 0.99 |
| d27 | 2.02 | 1.10 | 1.00 |
| d30 | 38.68 | 57.24 | 73.90 |

Numerical Embodiment 8

| Surface Number | r | d | nd | vd |
|---|---|---|---|---|
| 1 | 115.222 | 1.13 | 1.74950 | 35.3 |
| 2 | 55.688 | 7.06 | 1.49700 | 81.5 |
| 3 | −500.424 | 0.12 | | |
| 4 | 55.022 | 4.92 | 1.49700 | 81.5 |
| 5 | 309.513 | (variable) | | |
| 6* | 44.933 | 1.20 | 1.77250 | 49.6 |
| 7 | 14.944 | 6.53 | | |
| 8 | −44.748 | 1.15 | 1.81600 | 46.6 |
| 9 | 37.931 | 0.15 | | |
| 10 | 26.892 | 4.33 | 1.84666 | 23.9 |
| 11 | −51.741 | 1.59 | | |
| 12 | −24.658 | 1.09 | 1.77250 | 49.6 |
| 13 | 901.405 | (variable) | | |
| 14 (stop) | ∞ | 0.82 | | |
| 15 | 20.790 | 2.99 | 1.64769 | 33.8 |
| 16* | 151.892 | 0.36 | | |
| 17 | 51.742 | 2.22 | 1.58144 | 40.8 |
| 18 | −803.666 | 0.16 | | |
| 19 | 41.084 | 0.90 | 1.80518 | 25.4 |
| 20 | 12.139 | 4.59 | 1.51633 | 64.1 |
| 21 | 662.736 | (variable) | | |
| 22* | −28.060 | 2.16 | 1.85026 | 32.3 |
| 23 | −15.093 | 0.91 | 1.69680 | 55.5 |
| 24 | 92.898 | (variable) | | |
| 25* | 115.879 | 3.87 | 1.48749 | 70.2 |
| 26 | −23.514 | 0.00 | | |
| 27 | 62.601 | 4.17 | 1.49700 | 81.5 |
| 28 | −30.923 | 1.07 | 1.84666 | 23.9 |
| 29 | 198.855 | 0.16 | | |
| 30 | 46.530 | 3.89 | 1.80100 | 35.0 |
| 31 | −58.894 | (variable) | | |
| 32 | −785.553 | 2.43 | 1.92286 | 18.9 |
| 33 | −49.800 | 1.09 | 1.88300 | 40.8 |
| 34 | 36.102 | (variable) | | |
| image plane | ∞ | | | |

Aspheric Surface Data

6th surface

K = 0.00000e+000    A4 = 1.24738e-006    A6 = 5.98808e-009
A8 = -5.81939e-011    A10 = 2.17699e-013

16th surface

K = 0.00000e+000    A4 = 1.23929e-005    A6 = 1.15677e-008
A8 = -1.10386e-011

22nd surface

K = 0.00000e+000    A4 = 4.02281e-006    A6 = 3.36811e-009
A8 = -2.74174e-010    A10 = 2.78737e-012

25th surface

K = 0.00000e+000    A4 = -2.27904e-005    A6 = 2.16566e-008
A8 = -3.79959e-011

|  | wide angle | intermediate | telephoto |
|---|---|---|---|
| focal length | 20.14 | 62.85 | 259.66 |
| F-number | 3.31 | 4.63 | 5.88 |
| angle of view | 34.15 | 12.26 | 3.01 |
| d5 | 0.40 | 29.18 | 58.42 |
| d13 | 29.03 | 13.26 | 0.89 |
| d21 | 2.01 | 6.77 | 9.54 |
| d24 | 8.76 | 4.00 | 1.23 |
| d31 | 1.71 | 3.11 | 0.93 |
| d34 | 35.83 | 52.43 | 68.74 |

Numerical Embodiment 9

Surface Data

| Surface Number | r | d | nd | vd |
|---|---|---|---|---|
| 1 | 88.225 | 1.50 | 1.80100 | 35.0 |
| 2 | 58.096 | 8.60 | 1.43875 | 94.9 |
| 3 | -250.533 | 0.12 | | |
| 4 | 57.401 | 5.12 | 1.43875 | 94.9 |
| 5 | 187.731 | (variable) | | |
| 6* | 89.048 | 1.50 | 1.85400 | 40.4 |
| 7 | 16.392 | 6.00 | | |
| 8 | -41.056 | 1.20 | 1.88300 | 40.8 |
| 9 | 44.973 | 0.15 | | |
| 10 | 33.211 | 4.83 | 1.84666 | 23.9 |
| 11 | -33.154 | 0.65 | | |
| 12 | -23.510 | 1.10 | 1.80400 | 46.6 |
| 13 | -92.766 | (variable) | | |
| 14 (stop) | ∞ | 0.75 | | |
| 15 | 23.534 | 2.85 | 1.68893 | 31.1 |
| 16* | 188.709 | 0.10 | | |
| 17 | 39.015 | 1.00 | 1.80518 | 25.4 |
| 18 | 15.110 | 5.89 | 1.48749 | 70.2 |
| 19 | -66.433 | (variable) | | |
| 20* | -29.388 | 3.88 | 1.80518 | 25.4 |
| 21 | -16.392 | 1.00 | 1.62230 | 53.2 |
| 22 | 58.889 | (variable) | | |
| 23* | 53.929 | 5.01 | 1.48749 | 70.2 |
| 24 | -25.927 | 0.10 | | |
| 25 | -394.712 | 3.80 | 1.43875 | 94.9 |
| 26 | -24.576 | 1.25 | 1.84666 | 23.9 |
| 27 | -119.423 | 0.10 | | |
| 28 | 50.435 | 4.46 | 1.74100 | 52.6 |
| 29 | -58.015 | (variable) | | |
| 30 | 120.618 | 2.62 | 1.80809 | 22.8 |
| 31 | -118.028 | 1.00 | 1.77250 | 49.6 |
| 32 | 26.456 | (variable) | | |
| image plane | ∞ | | | |

Aspheric Surface Data

6th surface

K = 0.00000e+000    A4 = 2.19405e-006    A6 = 1.52063e-008
A8 = -1.33705e-010    A10 = 3.65346e-013

16th surface

K = 0.00000e+000    A4 = 7.69558e-006    A6 = 1.39771e-008
A8 = -6.74331e-011

20th surface

K = 0.00000e+000    A4 = 2.95464e-006    A6 = 1.01796e-008
A8 = -1.83369e-010    A10 = 6.01235e-013

23rd surface

K = 0.00000e+000    A4 = -2.05239e-005    A6 = 1.51354e-008
A8 = -2.24418e-011

|  | wide angle | intermediate | telephoto |
|---|---|---|---|
| focal length | 18.87 | 70.18 | 239.70 |
| F-number | 3.15 | 4.68 | 5.71 |
| angle of view | 35.90 | 11.01 | 3.26 |
| d5 | 0.77 | 30.75 | 60.73 |
| d13 | 31.31 | 8.85 | 0.32 |
| d19 | 1.73 | 9.10 | 12.29 |
| d22 | 11.80 | 4.43 | 1.24 |
| d29 | 2.17 | 5.40 | 0.94 |
| d32 | 37.71 | 56.94 | 69.92 |

Numerical Embodiment 10 unit mm

Surface Data

| Surface Number | r | d | nd | vd |
|---|---|---|---|---|
| 1 | 88.225 | 1.50 | 1.80100 | 35.0 |
| 2 | 58.096 | 8.60 | 1.43875 | 94.9 |
| 3 | -250.533 | 0.12 | | |
| 4 | 57.401 | 5.12 | 1.43875 | 94.9 |
| 5 | 187.731 | (variable) | | |
| 6* | 89.048 | 1.50 | 1.85400 | 40.4 |
| 7 | 16.392 | 6.00 | | |
| 8 | -41.056 | 1.20 | 1.88300 | 40.8 |
| 9 | 44.973 | 0.15 | | |
| 10 | 33.211 | 4.83 | 1.84666 | 23.9 |
| 11 | -33.154 | 0.65 | | |
| 12 | -23.510 | 1.10 | 1.80400 | 46.6 |
| 13 | -92.766 | (variable) | | |
| 14(stop) | ∞ | 0.75 | | |
| 15 | 23.534 | 2.85 | 1.68893 | 31.1 |
| 16* | 188.709 | 0.10 | | |
| 17 | 39.015 | 1.00 | 1.80518 | 25.4 |
| 18 | 15.110 | 5.89 | 1.48749 | 70.2 |
| 19 | -66.433 | (variable) | | |
| 20* | -29.388 | 3.88 | 1.80518 | 25.4 |
| 21 | -16.392 | 1.00 | 1.62230 | 53.2 |
| 22 | 58.889 | (variable) | | |
| 23* | 53.929 | 5.01 | 1.48749 | 70.2 |
| 24 | -25.927 | 0.10 | | |
| 25 | -394.712 | 3.80 | 1.43875 | 94.9 |
| 26 | -24.576 | 1.25 | 1.84666 | 23.9 |
| 27 | -119.423 | 0.10 | | |
| 28 | 50.435 | 4.46 | 1.74100 | 52.6 |
| 29 | -58.015 | (variable) | | |
| 30 | 120.618 | 2.62 | 1.80809 | 22.8 |
| 31 | -118.028 | 1.00 | 1.77250 | 49.6 |
| 32 | 26.456 | (variable) | | |
| image plane | ∞ | | | |

-continued unit mm

Aspheric Surface Data

6th surface

K = 0.00000e+000  A4 = 2.19405e−006  A6 = 1.52063e−008
A8 = −1.33705e−010  A10 = 3.65346e−013

16th surface

K = 0.00000e+000  A4 = 7.69558e−006  A6 = 1.39771e−008
A8 = −6.74331e−011

20th surface

K = 0.00000e+000  A4 = 2.95464e−006  A6 = 1.01796e−008
A8 = −1.83369e−010  A10 = 6.01235e−013

23rd surface

K = 0.00000e+000  A4 = −2.05239e−005  A6 = 1.51354e−008
A8 = −2.24418e−011

|  | wide angle | intermediate | telephoto |
|---|---|---|---|
| focal length | 18.87 | 70.18 | 239.70 |
| F-number | 3.15 | 4.68 | 5.71 |
| angle of view | 35.90 | 11.01 | 3.26 |
| d5 | 0.77 | 30.75 | 60.73 |
| d13 | 31.31 | 8.85 | 0.32 |
| d19 | 1.73 | 9.10 | 12.29 |
| d22 | 11.80 | 4.43 | 1.24 |
| d29 | 2.17 | 5.40 | 0.94 |
| d32 | 37.71 | 56.94 | 69.92 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-054368 filed Mar. 12, 2012, which is hereby incorporated by reference herein in its entirety.

What is claimed is:
1. A zoom lens comprising, in order from the object side to the image side:
a first lens unit having positive refracting power;
a second lens unit having negative refracting power;
a third lens unit having positive refracting power;
a fourth lens unit having negative refracting power;
a fifth lens unit having positive refracting power; and
a sixth lens unit having negative refracting power, in zooming from a wide angle end to a telephoto end, the lens units being moved such that a distance between the first lens unit and the second lens unit is increased, a distance between the second lens unit and the third lens unit is decreased, a distance between the third lens unit and the fourth lens unit is increased, and a distance between the fourth lens unit and the fifth lens unit is decreased, in focusing from an infinitely distant object to a near object, the sixth lens unit being moved toward the image side,

TABLE 1

|  | CONDITIONAL EXPRESSION (1) $D2Rw/fRw$ | CONDITIONAL EXPRESSION (2) $f1/\sqrt{fw \times ft}$ | CONDITIONAL EXPRESSION (3) $f2/\sqrt{fw \times ft}$ | CONDITIONAL EXPRESSION (4) $\beta 2t$ | CONDITIONAL EXPRESSION (5) $f3/f5$ | CONDITIONAL EXPRESSION (6) $f1/f2$ | CONDITIONAL EXPRESSION (7) $f4/\sqrt{fw \times ft}$ | CONDITIONAL EXPRESSION (8) $f6/skt$ |
|---|---|---|---|---|---|---|---|---|
| NUMERICAL EMBODIMENT 1 | 1.535 | 1.362 | −0.210 | −1.13 | 1.293 | −6.488 | −0.505 | −0.54 |
| NUMERICAL EMBODIMENT 2 | 1.539 | 1.426 | −0.211 | −1.13 | 1.004 | −6.745 | −0.485 | −0.47 |
| NUMERICAL EMBODIMENT 3 | 1.597 | 1.360 | −0.214 | −1.35 | 1.961 | −6.350 | −0.482 | −0.51 |
| NUMERICAL EMBODIMENT 4 | 1.547 | 1.537 | −0.254 | −1.13 | 1.654 | −6.056 | −0.911 | −0.94 |
| NUMERICAL EMBODIMENT 5 | 1.596 | 1.597 | −0.273 | −1.13 | 2.675 | −5.851 | −1.104 | −0.84 |
| NUMERICAL EMBODIMENT 6 | 1.569 | 1.567 | −0.216 | −1.00 | 1.060 | −7.248 | −0.580 | −0.86 |
| NUMERICAL EMBODIMENT 7 | 1.661 | 1.664 | −0.278 | −1.12 | 2.523 | −5.975 | −1.018 | −0.87 |
| NUMERICAL EMBODIMENT 8 | 1.441 | 1.335 | −0.210 | −1.15 | 1.293 | −6.350 | −0.501 | −0.77 |
| NUMERICAL EMBODIMENT 9 | 1.571 | 1.486 | −0.237 | −1.10 | 1.320 | −6.264 | −0.535 | −0.66 |
| NUMERICAL EMBODIMENT 10 | 1.605 | 1.506 | −0.244 | −1.11 | 1.282 | −6.176 | −0.553 | −0.66 |

|  | CONDITIONAL EXPRESSION (9) $vd1p$ | CONDITIONAL EXPRESSION (10) $\theta gF1p - 0.6438 + 0.001682 \times vd1p$ | CONDITIONAL EXPRESSION (11) $vd5p$ | CONDITIONAL EXPRESSION (12) $\theta gF5p - 0.6438 + 0.001682 \times vd5p$ | CONDITIONAL EXPRESSION (13) $vd6p$ | CONDITIONAL EXPRESSION (14) $Skw/fw$ |
|---|---|---|---|---|---|---|
| NUMERICAL EMBODIMENT 1 | 81.5 | 0.03085 | 81.5 | 0.03085 | 23.9 | 2.01 |
| NUMERICAL EMBODIMENT 2 | 81.5 | 0.03085 | 81.5 | 0.03085 | 22.8 | 2.16 |
| NUMERICAL EMBODIMENT 3 | 81.5 | 0.03085 | 81.5 | 0.03085 | 25.4 | 1.91 |
| NUMERICAL EMBODIMENT 4 | 81.5 | 0.03085 | 81.5 | 0.03085 | 22.8 | 1.96 |
| NUMERICAL EMBODIMENT 5 | 81.5 | 0.03085 | 81.5 | 0.03085 | 18.9 | 2.32 |
| NUMERICAL EMBODIMENT 6 | 81.5 | 0.03085 | 81.5 | 0.03085 | 18.9 | 2.17 |
| NUMERICAL EMBODIMENT 7 | 81.5 | 0.03085 | 81.5 | 0.03085 | 22.8 | 2.30 |
| NUMERICAL EMBODIMENT 8 | 81.5 | 0.03085 | 81.5 | 0.03085 | 18.9 | 1.78 |
| NUMERICAL EMBODIMENT 9 | 70.2 | 0.02113 | 70.2 | 0.02113 | 18.9 | 2.06 |
| NUMERICAL EMBODIMENT 10 | 94.9 | 0.04987 | 94.9 | 0.04987 | 18.9 | 2.00 | wherein the sixth lens unit includes one or more positive lenses, and wherein the zoom lens satisfies conditional expressions $$1.441 \leq D2Rw/fRw < 2.0, \text{ and}$$

$$18 < vd6p < 25.7,$$

where D2Rw is a distance, at the wide angle end, between rear principal point of the second lens unit and a front principal point of a rear lens group including the third and subsequent lens units, and fRw is a focal length of the rear lens group at the wide angle end, and vd6p is the Abbe number of the material of at least one of the positive lenses.

2. An image pickup apparatus comprising:
a zoom lens; and
an image pickup element that picks up an image formed by the zoom lens,
wherein, the zoom lens comprising, in order from the object side to the image side:
a first lens unit having positive refracting power;
a second lens unit having negative refracting power;
a third lens unit having positive refracting power;
a fourth lens unit having negative refracting power;
a fifth lens unit having positive refracting power; and
a sixth lens unit having negative refracting power, in zooming from a wide angle end to a telephoto end, the lens units being moved such that a distance between the first lens unit and the second lens unit is increased, a distance between the second lens unit and the third lens unit is decreased, a distance between the third lens unit and the fourth lens unit is increased, and a distance between the fourth lens unit and the fifth lens unit is decreased, in focusing from an infinitely distant object to a near object, the sixth lens unit being moved toward the image side,
wherein the sixth lens unit includes one or more positive lenses, and
wherein the zoom lens satisfies conditional expressions $$1.441 \leq D2Rw/fRw < 2.0, \text{ and}$$

$$18 < vd6p < 25.7,$$

where D2Rw is a distance, at the wide angle end, between a rear principal point of the second lens unit and a front principal point of a rear lens group including the third and subsequent lens units, fRw is a focal length of the rear lens group at the wide angle end, and vd6p is the Abbe number of the material of at least one of the positive lenses.

3. The zoom lens according to claim 1, satisfying a conditional expression $$1.2 < f1/\sqrt{(fw \times ft)} < 1.8,$$

where f1 is a focal length of the first lens unit, and fw and ft are focal lengths of the entire system at the wide angle end and the telephoto end, respectively.

4. The zoom lens according to claim 1, satisfying a conditional expression $$-0.3 < f2/\sqrt{(fw \times ft)} < -0.18,$$

where f2 is a focal length of the second lens unit, and fw and ft are focal lengths of the entire system at the wide angle end and the telephoto end, respectively.

5. The zoom lens according to claim 1, satisfying a conditional expression $$-1.6 < \beta 2t < -0.9,$$

where β2t is an image-forming magnification of the second lens unit at telephoto end.

6. The zoom lens according to claim 1, satisfying a conditional expression $$0.9 < f3/f5 < 3.0,$$

where f3 and f5 are focal lengths of the third lens unit and the fifth lens unit, respectively.

7. The zoom lens according to claim 1, satisfying a conditional expression $$-8.0 < f1/f2 < -5.0,$$

where f1 and f2 are focal lengths of the first lens unit and the second lens unit, respectively.

8. The zoom lens according to claim 1, satisfying a conditional expression $$-1.3 < f4/\sqrt{(fw \times ft)} < -0.4,$$

where f4 is a focal length of the fourth lens unit, and fw and ft are focal lengths of the entire system at the wide angle end and the telephoto end, respectively.

9. The zoom lens according to claim 1, satisfying a conditional expression $$-1.00 < f6/skt < -0.26,$$

where f6 is a focal length of the sixth lens unit, and skt is a distance between a final lens surface of the zoom lens and an image plane at the telephoto end.

10. The zoom lens according to claim 1,
wherein the first lens unit includes one or more positive lenses, and
wherein the zoom lens satisfies conditional expressions $$70 < vd1p < 96, \text{ and}$$

$$0.0185 < \theta gF1p - 0.6438 + 0.001682 \times vd1p < 0.051,$$

where vd1p is an Abbe number and θgF1p is a partial dispersion ratio with respect to g-line and F-line of a material of at least one of the positive lenses.

11. The zoom lens according to claim 1,
wherein the second lens unit includes three negative lenses and one or two positive lenses.

12. The zoom lens according to claim 1,
wherein the fourth lens unit is moved in a direction having a directional component perpendicular to the optical axis to move the image position.

13. The zoom lens according to claim 1,
wherein the fifth lens unit includes three positive lenses and one negative lens.

14. The zoom lens according to claim 1,
wherein the fifth lens unit includes one or more positive lenses, and
wherein the zoom lens satisfies conditional expressions $$70 < vd5p < 96, \text{ and}$$

$$0.0185 < \theta gF5p - 0.6438 + 0.001682 \times vd5p < 0.051,$$

where vd5p is an Abbe number and θgF5p is a partial dispersion ratio with respect to g-line and F-line of a material of at least one of the positive lenses.

15. The zoom lens according to claim 1, satisfying a conditional expression $$1.4 < Skw/fw < 2.5,$$

where fw is the focal length of the entire system at the wide angle end, and Skw is a distance between a final lens surface of the zoom lens and an image plane at the wide angle end.

16. The zoom lens according to claim 1, further comprising a seventh lens unit having positive refracting power on the image side of the sixth lens unit, the seventh lens unit not being moved for zooming.

17. The zoom lens according to claim 1, wherein, in zooming from the wide angle end to the telephoto end, the first lens unit and the third to sixth lens units are moved toward the object side.

* * * * *